(12) United States Patent
Tahhan et al.

(10) Patent No.: US 10,666,497 B2
(45) Date of Patent: May 26, 2020

(54) LOCALIZED SERVICE RESILIENCY

(71) Applicant: Intel Corporation, Santa Clara, CA (US)

(72) Inventors: Maryam Tahhan, Limerick (IE); John Joseph Browne, Limerick (IE); Eoin Walsh, Limerick (IE); Timothy Verrall, Pleasant Hill, CA (US); Rory Browne, Limerick (IE); Emma Louise Foley, Killorglin (IE); Shobhi Jain, Shannon (IE); Peter Mangan, Courtbrack Ave (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/015,247

(22) Filed: Jun. 22, 2018

(65) Prior Publication Data
US 2019/0394081 A1    Dec. 26, 2019

(51) Int. Cl.
*H04L 12/24* (2006.01)
*H04L 12/26* (2006.01)

(52) U.S. Cl.
CPC ...... *H04L 41/0654* (2013.01); *H04L 43/0811* (2013.01); *H04L 43/12* (2013.01)

(58) Field of Classification Search
CPC .............................. H04L 43/0811; H04L 43/12
See application file for complete search history.

(56) References Cited

U.S. PATENT DOCUMENTS

| | | | | |
|---|---|---|---|---|
| 7,904,546 | B1* | 3/2011 | Banda | G06F 11/203 709/224 |
| 2015/0098375 | A1* | 4/2015 | Ree | H04W 52/0296 370/311 |
| 2016/0170848 | A1* | 6/2016 | Yang | G06F 11/2023 714/4.12 |
| 2016/0357550 | A1* | 12/2016 | Thomas | G06F 8/77 |
| 2016/0364276 | A1* | 12/2016 | Wu | G06F 8/41 |
| 2017/0012898 | A1* | 1/2017 | Zhu | H04L 12/6418 |

(Continued)

FOREIGN PATENT DOCUMENTS

EP    3282640 A1    2/2018

OTHER PUBLICATIONS

"Cost of Data Center Outages Jan. 2016 Data Center Performance Benchmark Series", Emerson Network Power, Jan. 2016: https://planetaklimata.com.ua/instr/Liebert_Hiross/Cost_of_Data_Center_Outages_2016_Eng.pdf, 21 pages.

(Continued)

*Primary Examiner* — Chi Ho A Lee
(74) *Attorney, Agent, or Firm* — Patent Capital Group

(57) ABSTRACT

There is disclosed in one example a computing apparatus, including: a local platform including a hardware platform; a management interface to communicatively couple the local platform to a management controller; a virtualization infrastructure to operate on the hardware platform and to provide a local virtualized function; and a resiliency controller to operate on the hardware platform, and configured to: receive a resiliency policy from the management controller via the management interface, the resiliency policy including information to handle a fault in the virtualized function; detect a fault in the local virtualized function; and effect a resiliency action responsive to detecting the fault.

24 Claims, 17 Drawing Sheets

(56) References Cited

U.S. PATENT DOCUMENTS

| | | | |
|---|---|---|---|
| 2017/0134287 A1 | 5/2017 | Shaw et al. | |
| 2018/0026832 A1* | 1/2018 | Yu | H04L 41/0631 370/216 |
| 2018/0176115 A1* | 6/2018 | Yang | H04L 41/0631 |
| 2018/0309621 A1* | 10/2018 | Yuan | H04L 29/08 |
| 2019/0026168 A1* | 1/2019 | Qiu | G06F 9/546 |
| 2019/0089780 A1* | 3/2019 | Yousaf | G06F 9/5005 |
| 2019/0208553 A1* | 7/2019 | Chou | H04W 76/11 |

OTHER PUBLICATIONS

"Mobile Network Outages & Service Degradations" Heavy Reading Survey, Oct. 2013: http://www.heavyreading.com/spit/details.asp?sku_id=3144&skuitem_itemid=1545&promo_code=&aff_code=&next_url=%2Fsearch%2Easp%3F, 3 pages.

"Adding policy management requirements", 3GPP Draft; S5-164127 PCR TS 28.500 Adding Policy Management Requirements, 3rd Generation Partnership Project (3GPP), Retrieved from the Internet on Jul. 10, 2016: http://www.3gpp.org/ftp/Meetings_3GPP_SYNC/SA5/Docs.

"Network Functions Virtualisation (NFV); Resiliency Requirements", ETSI Draft; ETSI GS NFV-REL 001 V1.1.1 (Jan. 2015), European Telecommunications Standards Institute (ETSI), pp. 1-85.

European Extended Search Report in EP Patent Application No. 19175269.0 dated Oct. 10, 2019, 12 pages.

Machado, Christian Cleder, et al., "ANSwer: Combining NFV and SDN Features for Network Resilience Strategies", 2016 IEEE Symposium on Computers and Communication (ISCC), Jun. 27, 2016 [retrieved on Aug. 15, 2016].

* cited by examiner

LOCALIZED SERVICE RESILIENCY

FIELD OF THE SPECIFICATION

This disclosure relates in general to the field of data centers and network computing, and more particularly, though not exclusively, to a system and method for providing localized service resiliency.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
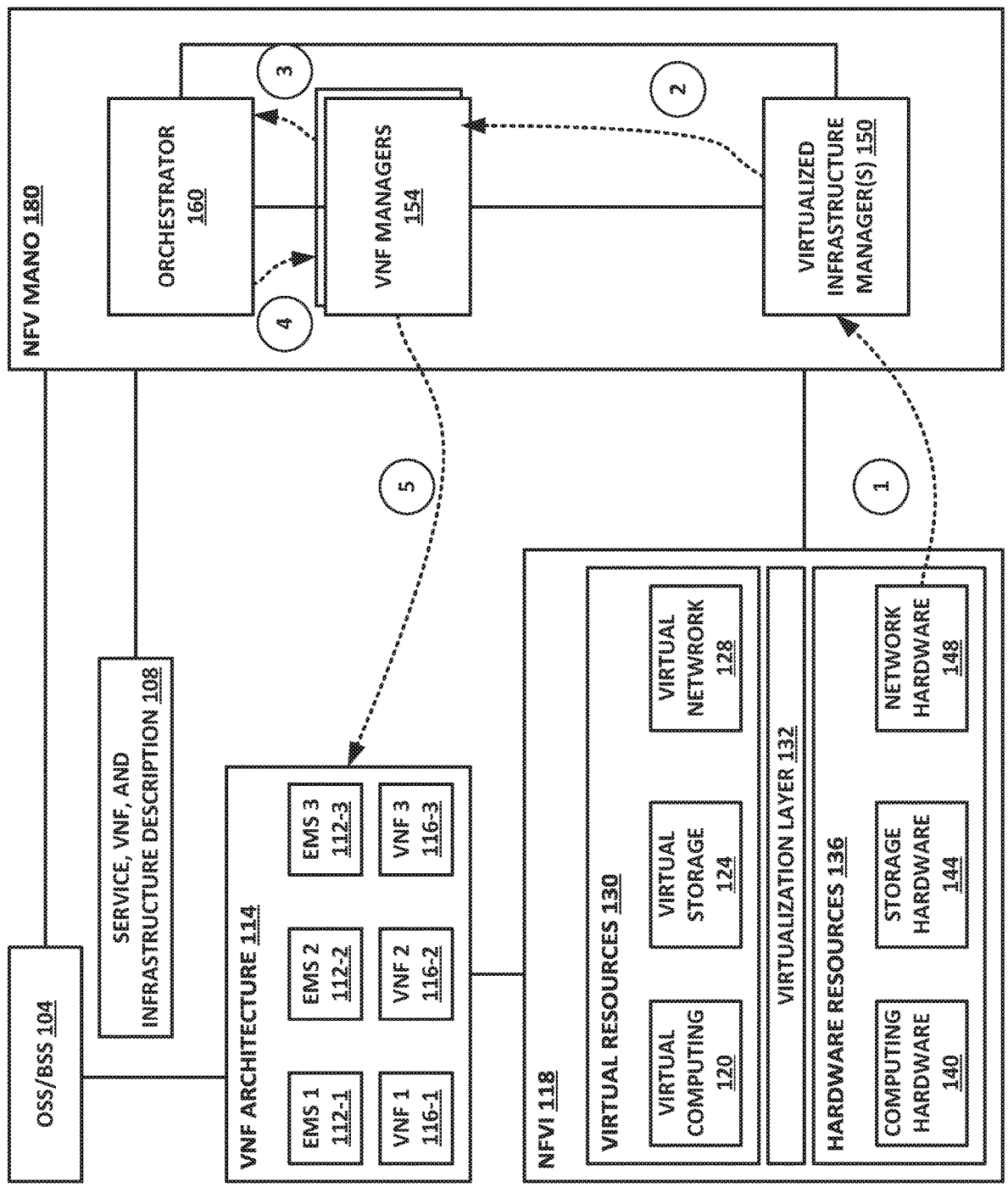
FIG. 1 is a block diagram of network function virtualization (NFV) management and orchestration without localized service resiliency, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary data center or telecommunication backend may employ techniques such as software defined networking (SDN) and network function virtualization (NFV) to provide flexibility, scalability, and resiliency in a data center. Using SDN and NFV, available hardware resources can be dynamically allocated and scaled out to provide an optimized networking platform. As network demands change, and as workloads shift, nodes such as load balancers, firewalls, antivirus services, deep packet inspection (DPI) services, routers, and other network functions can be dynamically allocated according to the present demands. If demand increases, more resources can be allocated, while if demand falls, resources can be spun down to save power and operating costs.

According to the distributed nature of a contemporary computing architecture, a management and orchestration (MANO) system may not be locally co-located with the nodes it controls. For example, a data center in Dublin, Ireland may be providing network services according to network function virtualization infrastructure (NFVI) definitions provided by a management console in San Francisco, Calif. As long as connectivity remains robust, there is no issue with a node in one part of the world being controlled by a management system in another part of the world.

However, in severe cases a local data center may be cut off from its management console. In that case, the local platform may not have a method of providing resiliency to local virtual network functions (VNFs) that may encounter errors while the disruption persists. For example, in the previous case where a Dublin data center is managed by a San Francisco management console, a natural disaster in either of those places could cause the data center to be cut off from the management console. This may be even more problematic if the natural disaster is in the region of the data center, as that data center may be expected to provide certain emergency services during the natural disaster. For example, some jurisdictions lawfully require telecommunication providers to maintain a designated uptime, and to provide persistent emergency communication services even in the case of natural disasters. If the data center cannot reach the management console, then an error in a VNF may cause a disruption of service that is unacceptable. Even worse, in the face of such a natural disaster, there is an increased likelihood that the local data center will encounter errors, as some equipment may be disrupted or damaged. Thus, it is all the more important for this data center to be able to maintain resiliency. Furthermore, in some extreme cases, a failed node may begin "chattering." Chattering occurs when a failed node continues to attempt to operate even after it is no longer functioning correctly. This failed node may continue to receive packets on its ingress interfaces, process those packets incorrectly, and then send out garbage on its egress interfaces. This garbage can then be propagated out to the network, and in severe cases, a single failed, chattering node can bring down an entire network.

It is therefore advantageous to provide a local resiliency controller on a local hardware platform that can handle resiliency functions according to a resiliency policy or other directives received from the management system. Having a local resiliency controller not only provides for resiliency in the case of catastrophic disasters, but even in the case of ordinary node failures, the localized resiliency controller can respond to a failure more quickly than a remote management console.

The local resiliency controller of the present specification maximizes the availability of an NFV-based service on a local platform using a multi-domain aware resiliency controller to automatically restore service on the platform, even when the management system is unavailable. The resiliency service described herein may use a preloaded resiliency policy received from the management system.

This enables a local platform to automatically apply immediate corrective local actions based on knowledge of the local physical domain resources, virtual resources, and best recovery methods for the NFV service. Advantageously, the local resiliency controller may have a more detailed or more immediate view of available local resources, and thus, in some cases, may be able to customize the resiliency policy to work best on the local platform. The local resiliency service can minimize outage times and revenue lost as a result of a fault of an NFV-based platform. A localized resiliency service may also help to ensure compliance with jurisdictional requirements for service uptime, including in the event of natural disasters.

By way of illustration, a typical mobile data service may experience approximately five outages or service deteriorations in one year, meaning approximately one every other month. In the aggregate, these outages can accrue into the billions of dollars of revenue losses, despite the several operators' efforts to minimize and plan for such outages.

An average telecommunication service provider may spend between 1.5 and 5% of its annual revenue repairing network issues. The primary drivers of such outages include, by way of nonlimiting example, congestion, physical link failures, overloading, and network equipment failures. As discussed above, service providers may typically employ a MANO, which uses a management stack in conjunction with analytics and an energy management system (EMS) to detect and correct hardware issues. Service providers may also use custom proprietary agents, which may be used on Big Iron appliances or original design manufacturer (ODM) platforms to help detect and correct hardware issues. Furthermore, cloud service providers (CSPs) may use dedicated hardware and software solutions to provide resiliency.

However, a MANO may fall short in detecting and associating physical and virtual faults. MANO, and other existing local platform controllers, may not successfully correlate physical and virtual domains to the appropriate faults and resource domains to trigger corrective actions.

Furthermore, a remote MANO may not be responsive enough to meet latency demands. For example, a telecommunications appliance may have a resiliency recovery scheme that requires restoration of a service from in between 10 milliseconds, up to one second. Beating these recovery times may require novel approaches as new fault domains arise in platforms, including hypervisor, virtual switch, and virtual resources.

Some existing solutions also do not provide service-specific resiliency. Local platform controllers may not be configured with resiliency policies specific to the service provided by the VNF being deployed on a platform.

It is also advantageous to provide survivability during management outages. If the management system (such as MANO) fails, it may be necessary to continue providing the best possible service until central management is restored. Failure to beat minimum local standards of service, or to continue providing resiliency during a loss of connectivity with the MANO, may result in penalties to a service provider, or action by watchdog groups for failure to meet advertised availability and speed benchmarks.

Scalability is also a concern. Some existing NFV systems may lack scalable resiliency to provide the best local action to handle storms of widespread faults, which can occur during a natural disaster or denial of service attack. The scalability problem may apply to multiple single platforms, as in conventional systems and disaggregated systems such as Intel® Rack Scale Architecture (RSA) and Rack Scale Design (RSD).

The custom proprietary agents discussed above may also lack a view of the virtual domain running on the platform, and how these hardware failures impact VNFs running on the platform.

Furthermore, while cloud services have provided solutions to attempt to address these concerns, they have at least in some cases failed to meet carrier grade requirements for core telecommunications infrastructure, such as "five nines" (commonly defined as 99.999%) reliability.

In an example of the present specification, a local resiliency service is provided by a local resiliency controller. The local resiliency controller operates a management interface to communicatively couple to a management system, such as an operational support system, business support system (BSS), MANO, or similar, to receive a resiliency policy or other similar directives. The local resiliency controller preloads the resiliency policy on the platform, and is thus prepared to handle physical faults, virtual faults, and connectivity faults, which may be uniquely identified for each VNF. In the event of a fault, the resiliency controller automatically applies immediate corrective local actions based on the local physical domain resources, virtual resources, and best available recovery methods for the NFV service. The resiliency controller can then operate the management interface to notify the management system of the resiliency action taken. Note that notification may be via a one-directional message on the management interface, wherein the one-directional message is a message that may receive but does not require an acknowledgement or response from the management controller. Advantageously, this one-directional message does not itself become a bottleneck if connectivity to the management controller is lost.

The resiliency control of the present specification also differentiates fault domains and provides policies to handle management connectivity, virtual switch connectivity, physical resource failures, and virtual resource failures. The resiliency controller can also identify virtual resource behavior, denial of service behavior, and process behavior, and can mitigate these without management intervention.

Furthermore, the resiliency controller of the present specification can inspect the results of a resiliency action, and determine whether the resiliency action was successful. If the resiliency action is unsuccessful, the local resiliency controller can notify the management controller with a one-directional message on the management interface, and can then place the affected service into a failsafe mode. Placing the affected service or node into a failsafe mode may include, by way of example, disabling one or more egress ports (either hardware egress ports or virtual egress ports) of the affected node, to ensure that the node cannot begin chattering and negatively affect other nodes in the network.

A contemporary computing platform, such as a hardware platform provided by Intel® or similar, may include a capability for monitoring device performance and making decisions about resource provisioning. For example, in a large data center such as may be provided by a CSP, the hardware platform may include rackmounted servers with compute resources such as processors, memory, storage pools, accelerators, and other similar resources.

By way of nonlimiting example, as used in the present specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power instruction set architecture (ISA) processors, to name just a few.

As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer.

As used in the present disclosure, a VM is an isolated partition within a computing device that allows usage of an operating system and other applications, independent of other programs on the device in which it is contained. Containerization is a method of providing system resources wherein instances of network functions are provided in "containers" that are separated from one another, but that share underlying operating system, memory, and driver resources. VMs, containers, and similar may be generically referred to as "guest" systems.

A system and method for providing localized service resiliency will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of network function virtualization (NFV) management and orchestration without localized service resiliency, according to one or more examples of the present specification.

The block diagram of FIG. 1 illustrates management and orchestration that may occur according to existing or known methods. Note that the local resiliency service of the present specification does not necessarily replace existing management infrastructure, but rather may supplement that infrastructure by providing localized resiliency services that can operate with less latency than remote resiliency services, and that can continue to operate, even in the event of failure of the management interface.

In the example of FIG. 1, an NFV 118 is running on a local node including hardware resources 136. Hardware resources 136 may include, by way of illustrative and nonlimiting example, computing hardware 140, storage hardware 144, and network hardware 148. Hardware resources 136 operate a virtualization layer 132, which then provides virtual resources 130 to NFVI 118. Virtual resources 130 may include virtual computing 120, virtual storage 124, and virtual network 128. Using these virtual resources 130, NFVI 118 can instantiate one or more virtual machines, which can provide one or more VNFs according to network needs.

NFVI 118 may provide a VNF architecture 114. VNF architecture 114 may include, by way of nonlimiting example, a plurality of EMSs 112. These may include, namely, EMS 1 112-1, EMS 2 112-2, and EMS 3 112-3. VNF architecture 114 may also provide a plurality of VNFs 116, in this example namely VNF 1 116-1, VNF 2 116-2, and VNF 3 116-3.

NFVI 118 may be managed by virtualized infrastructure managers 150. Note that while virtualized infrastructure managers 150 are illustrated in this example as being part of NFV MANO 180, virtualized infrastructure managers 150 may not necessarily be co-located with the rest of NFV MANO 180. Instead, virtualized infrastructure managers 150 may be local software services that provide localized infrastructure management. In contrast, VNF managers 154 and orchestrator 160 may in some cases be remote resources of NFV MANO 180. There is also shown here an operational support system/business support system (OSS/BSS) 104, which can provide service, VNF, and infrastructure descriptions 108 to NFV MANO 180.

For purposes of this specification, OSS/BSS 104 and NFV MANO 180 may be considered jointly to be a management system, and NFVI 118 communicatively couples to the management system via a management interface. This management interface may be, by way of nonlimiting example, a dedicated hardware management interface, an Ethernet or other network connection, or any other data or communication interface that allows NFVI 118 to communicate with the management system.

The management system may have several responsibilities, including MANO and NFV MANO, and in this example is broken up into three functional blocks.

Orchestrator 160 is responsible for onboarding of new network services and VNF packages. According to examples of the present specification, orchestrator 160 may also handle network service lifecycle management, global resource management, and validation and authorization of NFVI resource requests.

VNF managers 154 may be responsible for overseeing the lifecycle management of VNF instances, coordinating and adapting roles for configuration, and event reporting between NFVI and enterprise network management system (E/NMS).

Virtualized infrastructure manager (VIM) 150 may be responsible for controlling and managing the NFVI compute, storage, and network resources.

As discussed above, difficulties may occur when NFVI 118 is unable to reach the management system via the management interface. Furthermore, even when NFVI 118 can reach the management system via the management interface, response to a fault may be relatively slow.

For example, an error flow is shown in FIG. 1. At operation 1, a fault occurs within NFVI 118. In this example, the fault is illustrated as a failure of network hardware 148, but the fault may be any fault, including within hardware resources 136, virtual resources 130, or within any of VNFs 116.

NFVI 118 notifies virtualized infrastructure manager 150 of the fault. At operation 2, virtualized infrastructure manager 150 queries VNF managers 154 for a solution to the fault identified in operation 1.

At operation 3, VNF managers 154 query orchestrator 160 for a solution for the fault.

At operation 4, orchestrator 160 consults its internal resiliency policy to identify a solution for the encountered fault. Orchestrator 160 then provides the solution to VNF managers 154.

VNF managers 154, acting on the resiliency policy provided by orchestrator 160, then operates on VNF architecture 114 to effect a resiliency action to mitigate the issue.

Figure 2:
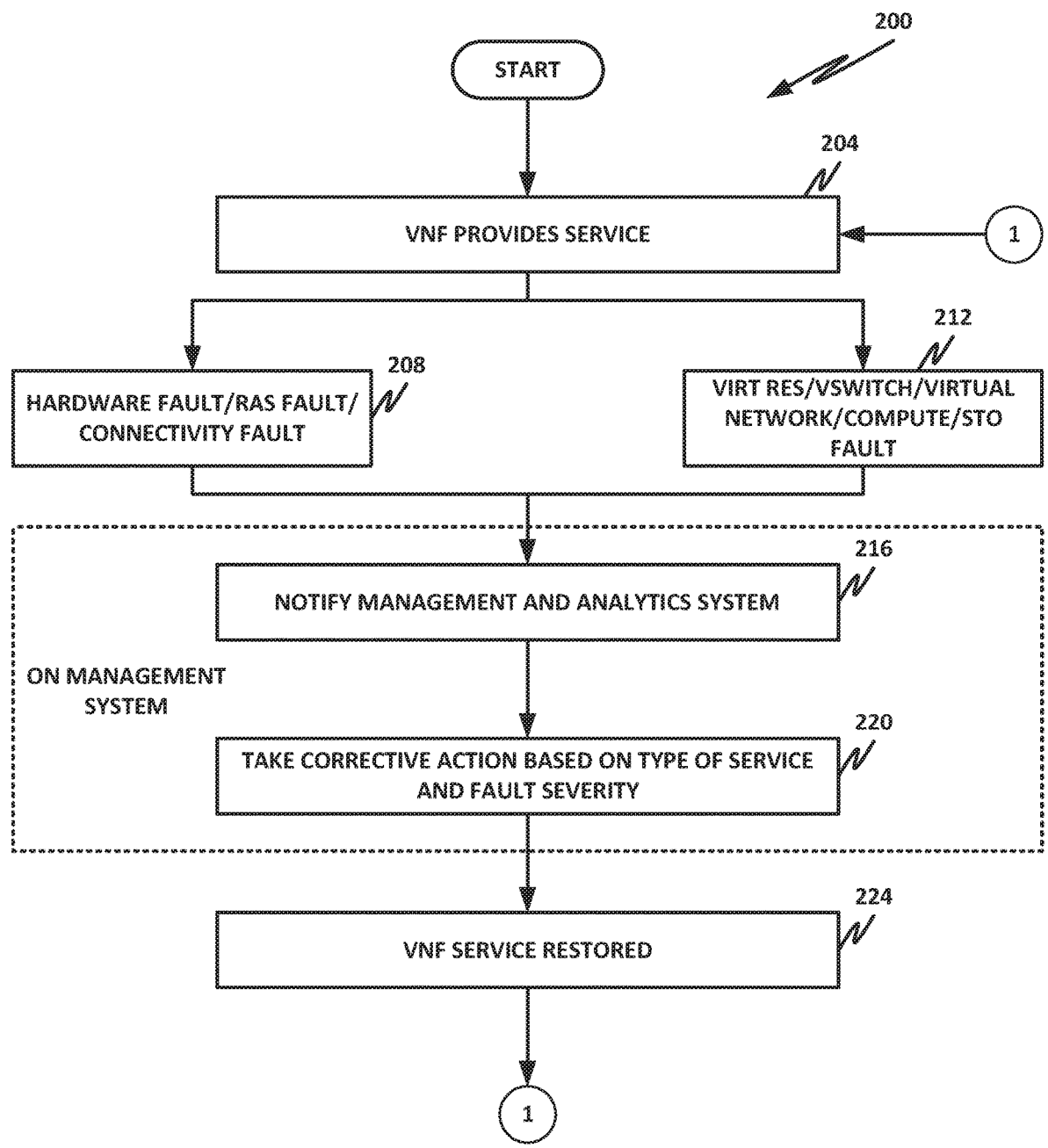
FIG. 2 is a flowchart of providing service resiliency without a localized resiliency service, according to one or more examples of the present specification.

FIG. 2 is a flowchart of providing service resiliency without a localized resiliency service, according to one or more examples of the present specification.

Method 200 illustrates remote resiliency as may be provided in the illustration of FIG. 1 when a local resiliency service is not available.

In block 204, a VNF is providing VNF services.

However, the VNF may encounter a problem. For example, the VNF may have a particular reliability, availability, and serviceability (RAS) target. An RAS target may include, for example, a requirement to produce correct output within a temporal window, a requirement to be operational a certain percentage of time within a temporal window, and simplicity or speed of repair or maintenance. In block 208, for example, this may be a hardware fault, a RAS fault, or connectivity fault. Alternatively, in block 212, the VNF may encounter a virtual resource/virtual switch/virtual network/virtual compute or storage fault.

The operations of blocks 216 and 220 then take place on the management system, which may be remote from the local system.

In block 216, the NFVI notifies the management and analytics system.

In block 220, the management system identifies a preferred resiliency action to mitigate the issue, then instructs the local platform to take corrective action based on the type of service and fault severity.

In block 224, the VNF service may be restored. Following on page connector 1, returning to block 204, the VNF may then continue to provide its service.

Figure 3:
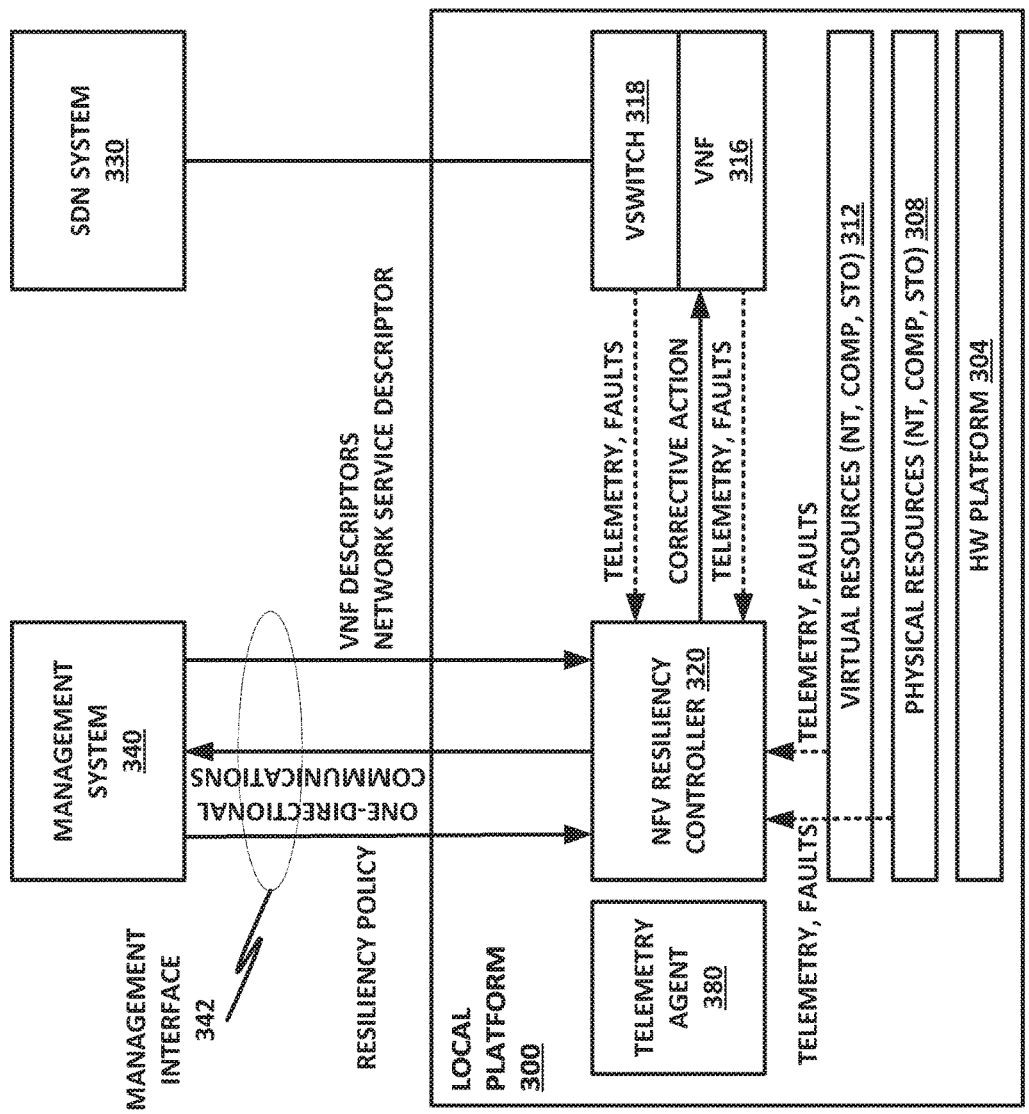
FIG. 3 is a block diagram of a local platform with a local NFV resiliency controller, according to one or more examples of the present specification.

FIG. 3 is a block diagram of a local platform with a local NFV resiliency controller, according to one or more examples of the present specification.

In the example of FIG. 3, local platform 300 includes a hardware platform 304, physical resources such as network, compute, and storage resources 308, virtual resources 312, such as virtual network, compute, and storage resources, a VNF 316 and a virtual switch (vSwitch) 318. In addition, a telemetry agent 380 is provided. Telemetry agent 380 collects telemetry and fault information about local platform 300 and provides telemetry to resiliency controller 320.

Telemetry for local platform 300 may include, by way of nonlimiting example, information about hardware and/or software failures, bandwidth, congestion, RAS factors, uptime, downtime, boot time, bottlenecks, oversubscription of resources, undersubscription of resources, or any other relevant factor that may be valuable in applying a resiliency policy.

Local platform 300 also provides NFV resiliency services via NFV resiliency controller 320.

NFV resiliency controller 320 is a local resiliency controller, which may include, by way of nonlimiting example, software to operate on hardware platform 304, software that may operate on a dedicated co-processor, firmware, or a hardware device such as a field-programmable gate array (FPGA), application-specific integrated circuit (ASIC), or other dedicated hardware block. In some examples, all or part of local platform 300 may be provided in an integrated circuit or system-on-a-chip (SoC), in which case NFV resiliency controller 320 may be provided as a dedicated intellectual property (IP) block.

In some embodiments of the present disclosure, the resiliency controller may be implemented in software on the central processing unit (CPU) complex, on the Intel® Innovation Engine (IE), the Intel® management engine (ME), an FPGA, an ASIC, or a dedicated hardware IP block.

Hardware implementations outside of the CPU complex have some advantages, including that the resiliency controller is isolated from software faults, and the resiliency controller is protected from unrecoverable machine check architecture (MCA) events that may halt the CPU. In the case that resiliency controller 320 is implemented in software on the operating core, other steps may be taken to protect resiliency controller 320 from software faults. These include placing resiliency controller 320 in a highly privileged program privilege ring, or even placing it in software that operates either independently or outside of the main operating system software, by way of nonlimiting example.

In cases where resiliency controller 320 is instantiated in the CPU complex, recoverable MCA events may be handled by the resiliency controller. However, to protect against "3-strike" or unrecoverable MCA events, an off complex resiliency controller may be used.

Examples of recoverable MCA events include, by way of nonlimiting example:
 a. Processor RAS features including error correcting code (ECC) and parity check, CDCM, Intel® Quick-Path Interconnect (QPI) healing, corrected machine check interrupt (CMCI), and CPU hot-add.
 b. Memory RAS features including memory demand, dynamic random access memory (DRAM), single device data correction (SDDC), memory mirroring, scalable memory interconnect (SMI) reliability, and failed dual in-line memory module (DIMM).
 c. Others, including bad pages, cache errors, input/output (I/O) errors, and thermal events.
 d. RAS features defined in PCIe specifications.
 e. Advanced error report (AER) and advanced error reporting and recovery (AERR), available in most Linux distributions.

Furthermore, in some cases, hardware platform 304 may include one or more cores, and NFV resiliency controller 320 may include hooks into a core architecture, such as microcode in the core that is designed specifically to handle functions of NFV resiliency controller 320.

Figure 7:
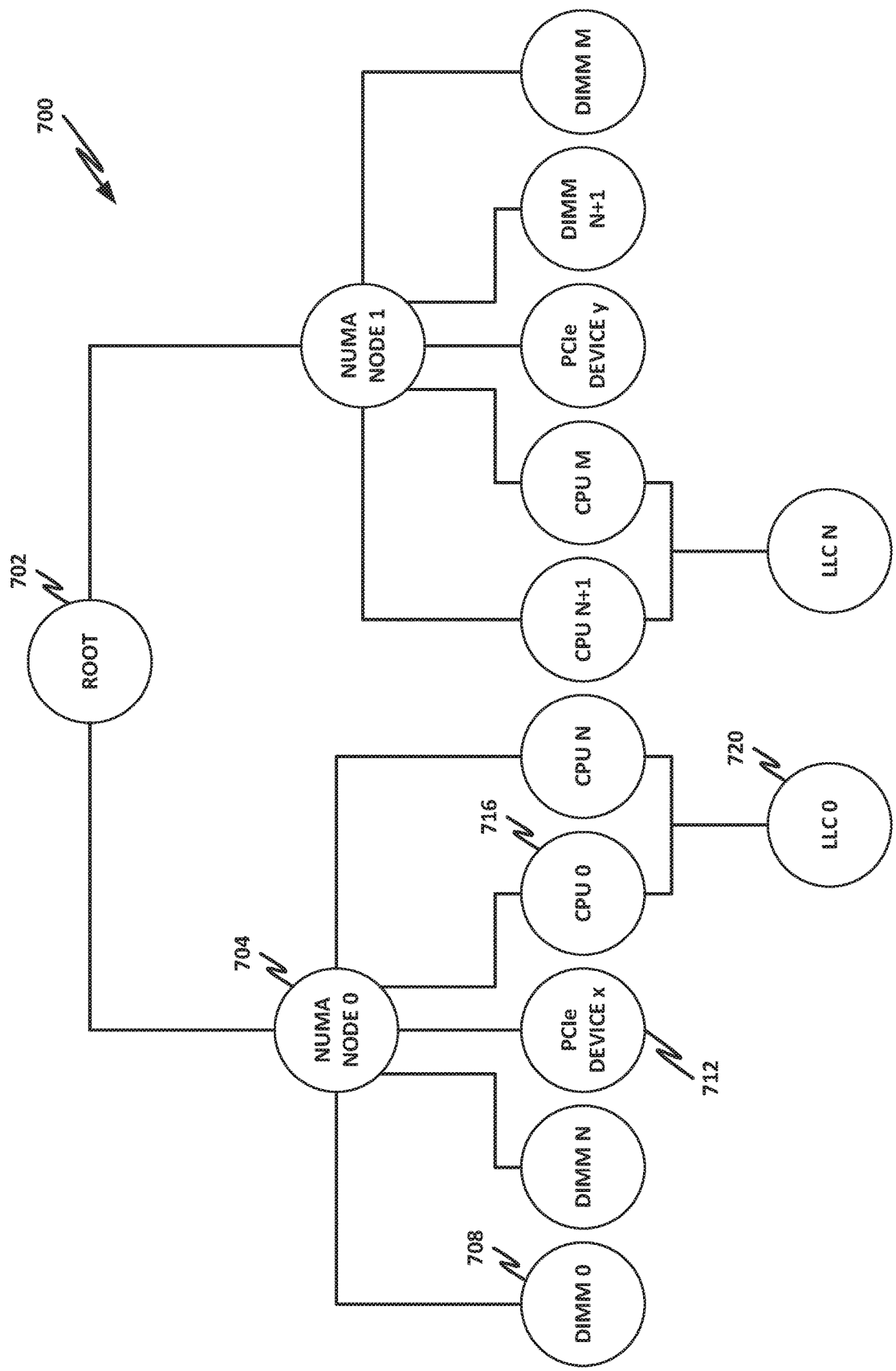
FIG. 7 is a block diagram of a hardware dependency graph, according to one or more examples of the present specification.

NFV resiliency controller 320 may be configured to scan the hardware of local platform 300 to establish a hardware topology connected graph. An illustration of a hardware topology connected graph is shown in FIG. 7. NFV resiliency controller 320 may receive telemetry and fault data from VNF 316 and vSwitch 318. It may also receive telemetry and fault data from physical resources 308 and virtual resources 312. From management system 340, NFV resiliency controller 320 may receive a resiliency policy, as well as VNF descriptors and network service descriptors. At appropriate times, NFV resiliency controller 320 may communicate with management system 340 via management interface 342. In some cases, communication with management system 340 on management interface 342 may include one-directional communications, meaning communications that may receive but do not require an acknowledgement or response from management system 340. Such one-directional communications can be important in cases where connectivity with management system 340 via management interface 342 is uncertain, allowing resiliency controller 320 to provide notifications to management system 340, while preventing those communications from becoming a bottleneck as resiliency controller 320 waits for a response that may or may not come.

By way of illustrative example, NFV resiliency controller 320 receives, stores, and executes on the following:
  a. Placement policy from the management system for the VNFs that are in operation on the platform. This allows NFV resiliency controller 320 to add the virtual domain elements to the hardware graph established during its hardware scan.
  b. NFVI management policy.
  c. VNF lifecycle management policy.
  d. Resiliency policy pushed to it from the management system via management interface 342.
  e. Other management policies that are pushed from the management system (such as centralized MANO) via management interface 342.
  f. Signals to the central management system if policy application has failed for some reason, so that MANO may adjust the policy as required. Note that such signals may be one-directional communications.

NFV resiliency controller 320 may also carry out local corrective actions for multiple fault domain physical resources, virtual resources, virtual switching, and management interfaces (regardless of connectivity to management system 340). This corrective action may include recovery from denial of service attacks and software faults.

Advantageously, a local NFV resiliency controller 320 provides immediate remediation of failures, or applications of management policies within time frames that better meet requirements, including telecommunications uptime requirements. Thus, service downtime is minimized by quickly applying VNF management policies. This becomes an even greater advantage when an operator wishes to outsource aspects of OSS/BSS into a cloud domain. Note that many mission-critical telecommunication services require a fault detection and correction time in the range of 10 to 50 milliseconds. This can be difficult to achieve when resiliency control resides off-site.

In the case of failure of management system 340, or failure of connection to management system 340, full network failures can be avoided because managed network elements can continue to operate with appropriate policies and actions according to resiliency controller 320. Local platform 300 may also be configured with secondary or backup MANO interfaces, should the primary MANO fail.

This also enables service-specific failsafe behavior on the platform. When NFV resiliency controller 320 takes a resiliency action, for example on VNF 316, it can inspect the result to ensure that the action succeeded. If the action does not succeed, then resiliency controller 320 can place VNF 316 into a failsafe mode, which may include disabling one or more egress ports to ensure that VNF 316 is not spewing garbage packets out to the network and possibly bringing down other nodes. This can prevent downstream chatter and enable faster system recovery by putting platforms and services in good recoverable states.

NFV resiliency controller 320 may also be configured to survive or recover from events such as network failure or managing power failure.

In the event of a network failure, resiliency controller 320 may be notified by the telemetry and faults provided by the network interface card (NIC), as illustrated in FIG. 3 between block 308 and block 320. Resiliency controller 320 may then take action defined by the network failure policy previously provided by management system 340. For example, the network failure recovery action may be to switch network ports and allow a secondary port to act as management interface 342.

In the event of a power failure recovery, resiliency controller 320 may be notified of the unexpected shutdown by reading the operating system (OS) syslog on recovery. This log can contain the crash indication on power outage, or an unexpected shutdown status indication. Resiliency controller 320 may then take action as defined by the NFVI power failure recovery policy previously provided by management system 340 via management interface 342.

Note that in various embodiments, management system 340 and resiliency controller 320 may have distinct responsibilities.

Management system 340 may work with templates for standard VNFs, and gives users the ability to pick and choose from existing NFVI resources to deploy their platforms or elements. Management system 340 informs resiliency controller 320 of VNF deployments and lifecycle changes (e.g., VNFs added or removed from the platform).

Management system 340 also selects and deploys resiliency policy, VNF policy, and NFVI policy, and provides these to resiliency controller 320 via management interface 342. These may be selected to match the service level agreements (SLAs) of the VNFs selected and deployed on local platform 300.

Resiliency controller 320 is responsible for generating and maintaining a topology hardware dependency graph. NFVI resiliency controller 320 receives and stores the resiliency policy, VNF policy, and NFVI policy provided by management system 340 via management interface 342, and associates hardware resources to VNFs deployed as part of the management system lifecycle management. Resiliency controller 320 continually monitors the fault domains on local platform 300. On detection of a fault in one of the fault domains, resiliency controller 320 triggers the associated resiliency policy action for the associated VNF.

In the case of a fault associated with an NFVI domain, such as a vSwitch or management interface, resiliency controller 320 triggers the associated NFVI resiliency policy for that fault domain.

Figure 4A:
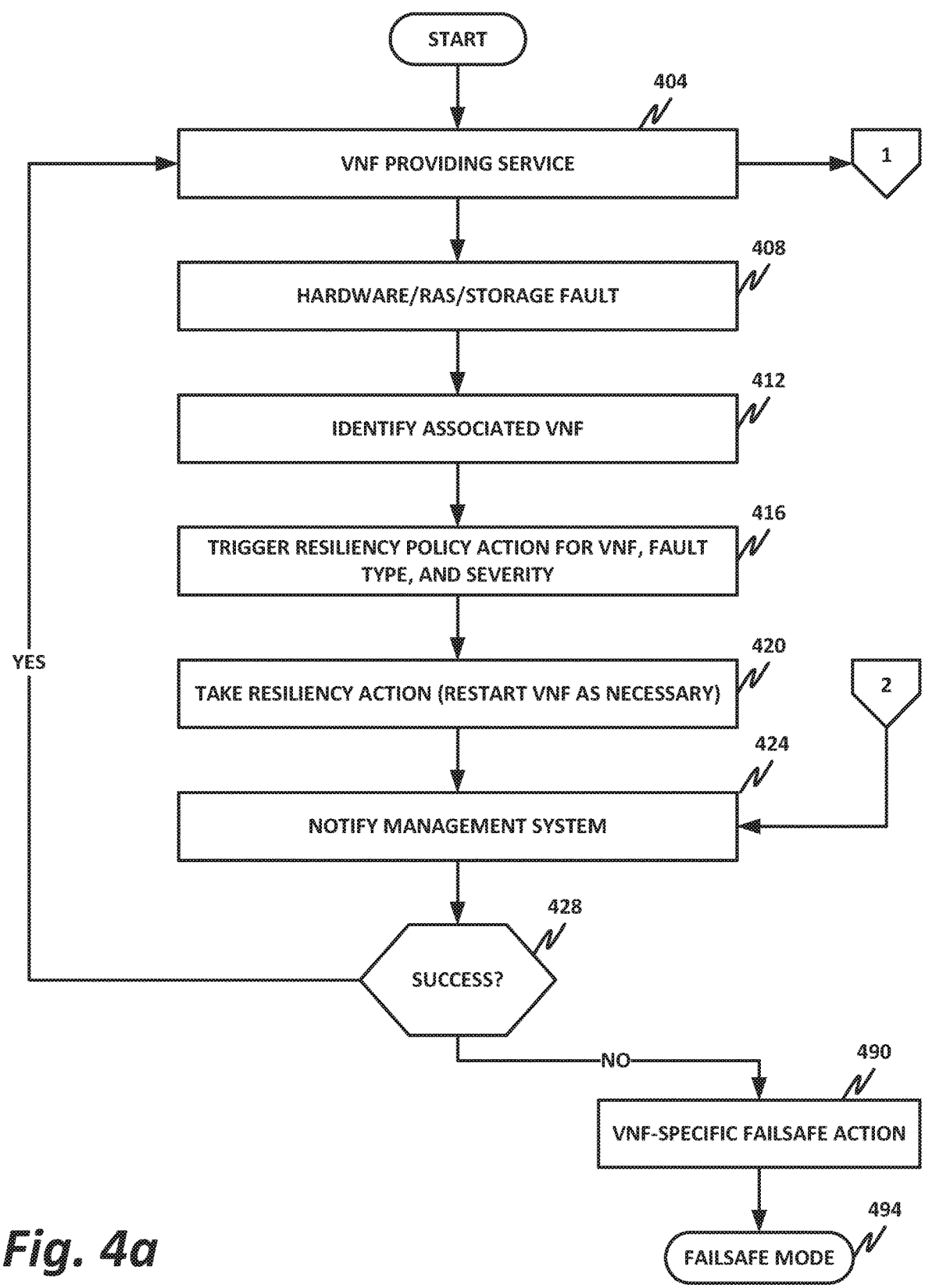
FIGS. 4a and 4b are a flowchart of methods of providing localized NFV resiliency responsive to a hardware/reliability, availability and serviceability (RAS)/storage fault or a virtual resource fault, according to one or more examples of the present specification.
Figure 4B:
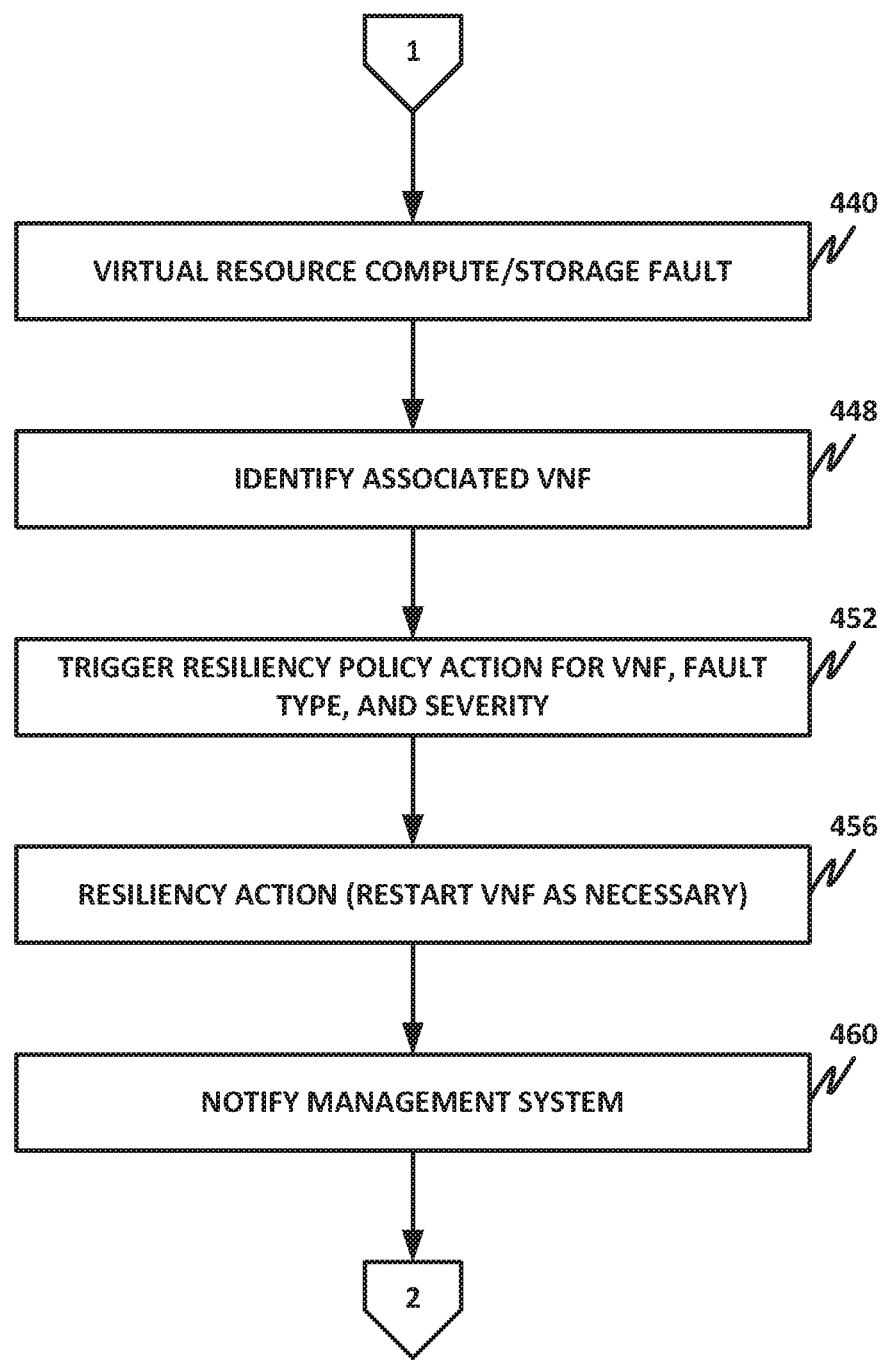

FIGS. 4a and 4b are a flowchart of methods of providing localized NFV resiliency responsive to a hardware/reliability, availability and serviceability (RAS)/storage fault or a virtual resource fault, according to one or more examples of the present specification.

Starting in block 404, the VNF is providing a service according to its designated network function.

In block 408, the VNF encounters a hardware, RAS, or storage fault. Alternatively, following off page connector 1 to FIG. 4b, the VNF may encounter a virtual resource fault such as a virtual compute or storage fault.

Following the path of the hardware fault of block 408, in block 412, the resiliency controller identifies the VNF associated with the hardware fault.

In block 416, the resiliency controller triggers a resiliency policy action for the VNF, based for example on the VNF identity, the NFVI for the VNF, the fault type, and the severity of the fault.

In block 420, the resiliency controller takes a resiliency action. In some embodiments, this may include restarting the VNF as necessary.

In block 424, the resiliency controller notifies the management system of the resiliency action taken. As described in previous FIGURES, this may be a one-directional message, which ensures that the notification does not itself become a bottleneck. In decision block 428, the resiliency controller determines whether the attempted resiliency action has successfully repaired the VNF. If the repair was successful, then returning to block 404, the VNF continues providing its service.

Returning to block 428, if the repair was not successful, then in block 490, the resiliency controller may take a VNF-specific failsafe action. This may include, for example, placing the VNF in a failsafe mode in which one or more egress ports are disabled, thus preventing downstream chattering. In block 424, the VNF is in failsafe mode and the method is done.

Returning to off page connector 1, on FIG. 4b, the VNF has encountered a virtual resource fault such as a virtual compute or virtual storage fault.

In block 448, the resiliency controller identifies the associated VNF.

In block 452, the resiliency controller triggers a resiliency policy action for the VNF, based on, for example, the VNF identity as defined in the NFVI, the fault type, and the fault severity.

In block 456, the resiliency controller takes the resiliency action. As necessary, this may include restarting the VNF. In block 460, the resiliency controller notifies the management system of the resiliency action. This may be done by way of a one-directional message. Control then follows off page connector 2 back to block 424. In block 424 the management system is notified of the resiliency action, which again may be conveyed via one-directional message. In decision block 428, the resiliency controller determines whether the action was successful. If the action was successful, then in block 404, the VNF continues to provide its service.

If the resiliency action was not successful, then in block 490, the resiliency controller takes a VNF-specific failsafe action. This may include disabling egress ports to avoid downstream chattering.

In block 494, the VNF is in failsafe mode and the method is done.

Figure 5:
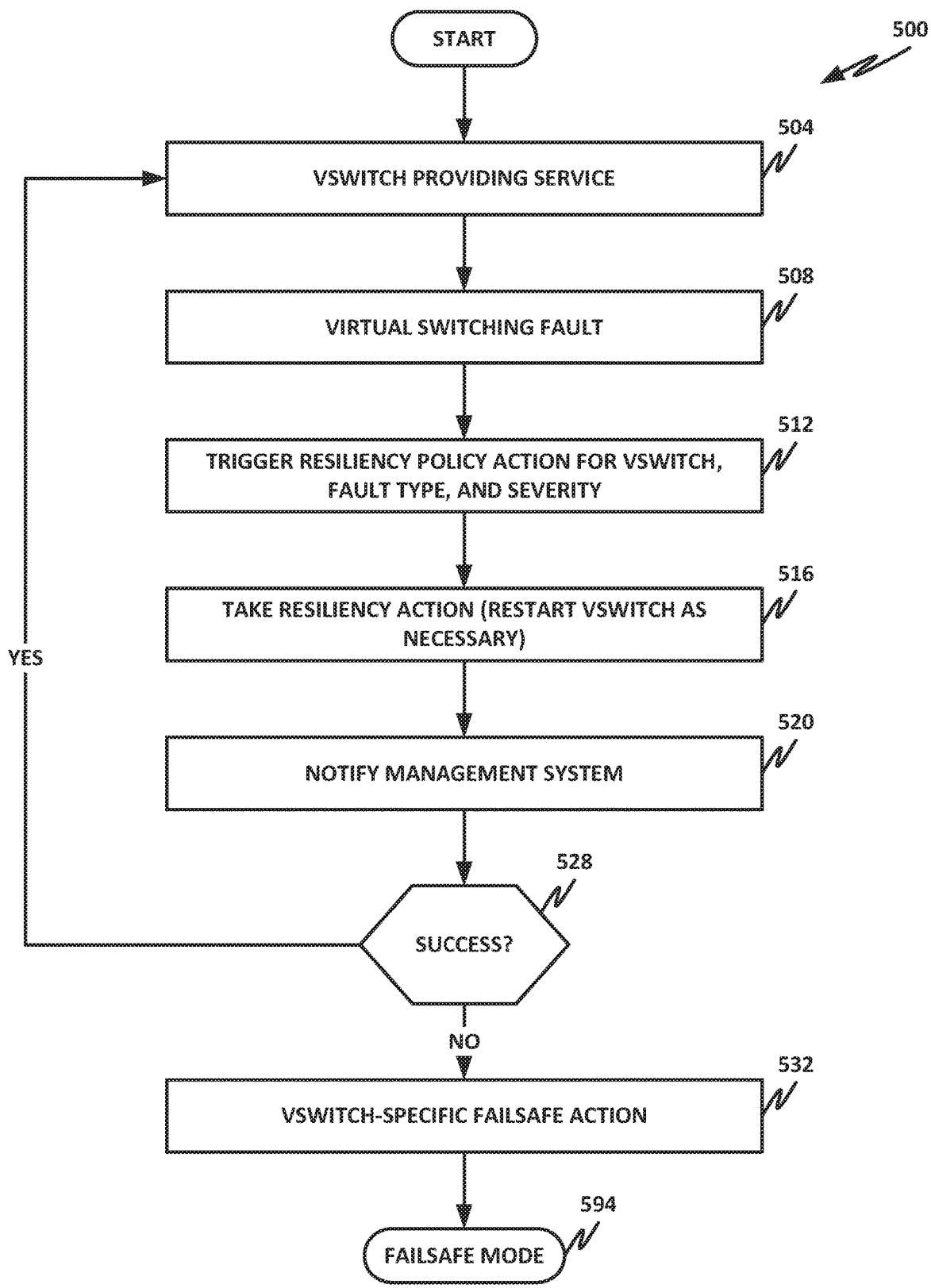
FIG. 5 is a flowchart of providing localized resiliency service responsive to a virtual switching fault, according to one or more examples of the present specification.

FIG. 5 is a flowchart of providing localized resiliency service responsive to a virtual switching fault, according to one or more examples of the present specification.

In block 504, the vSwitch is providing its virtual switching services. In block 508, the vSwitch encounters a virtual switching fault.

In block 512, responsive to the virtual switching fault, the resiliency controller triggers a resiliency policy action for the vSwitch. This may depend on the identity of the vSwitch, the fault type, and the fault severity.

In block 516, the resiliency controller takes the resiliency action, which may include as necessary restarting the vSwitch.

In block 520, the resiliency controller notifies the management system of the resiliency action. As in previous examples, this may include a one-directional message.

In decision block 528, the resiliency controller determines whether the resiliency action was successful. If the resiliency action was successful, then in block 504, the vSwitch continues providing its virtual switching services.

In block 528, if the resiliency action was not successful, then in block 532, the resiliency controller takes a vSwitch-specific failsafe action. This can include disabling ingress or egress ports of the vSwitch, and may also include marking the vSwitch as unavailable so that nodes in the system do not attempt to use the vSwitch. In block 594, the vSwitch is in failsafe mode, and the method is done.

Figure 6:
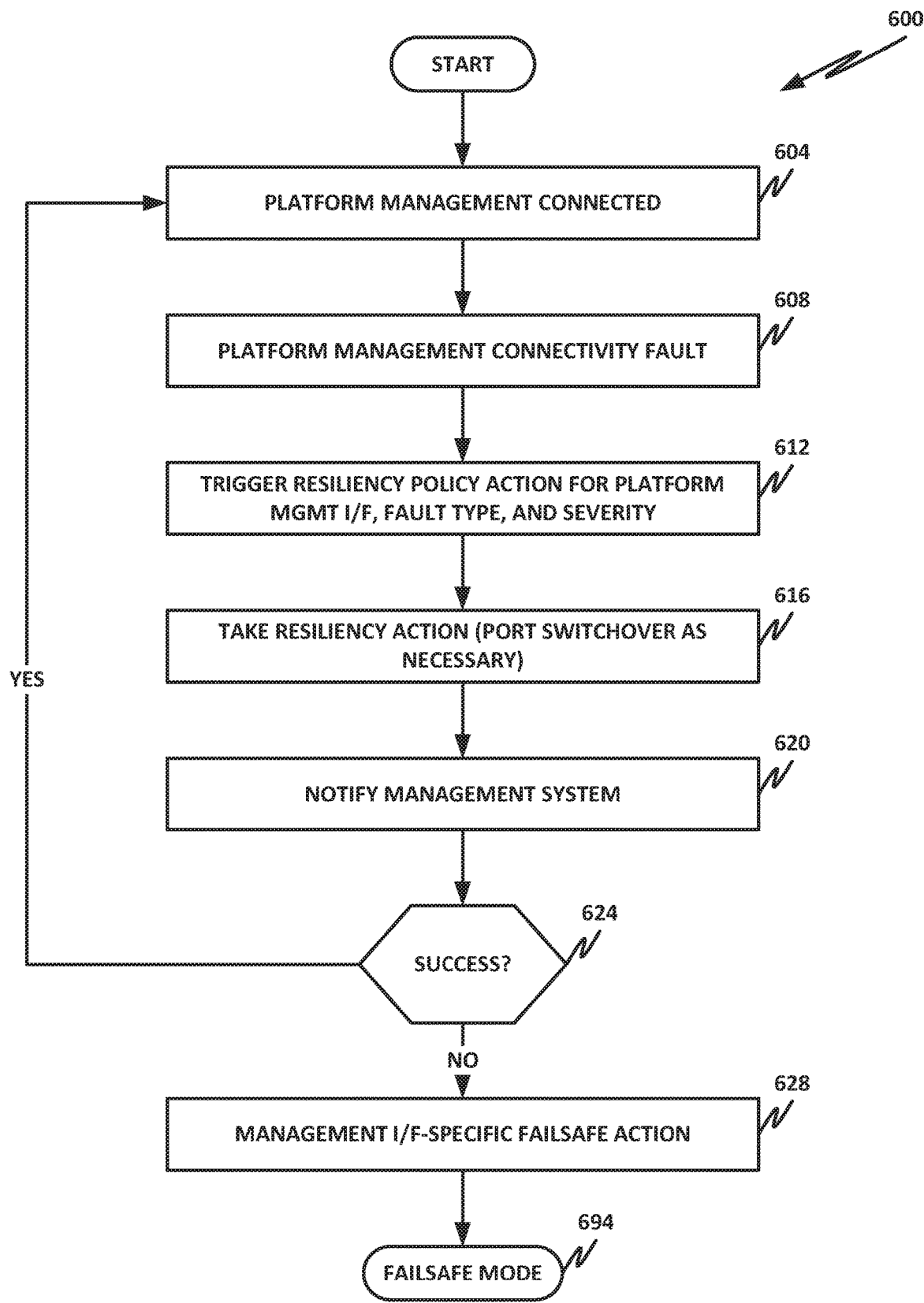
FIG. 6 is a flowchart of providing localized resiliency service responsive to a platform management connectivity fault, according to one or more examples of the present specification.

FIG. 6 is a flowchart of providing localized resiliency service responsive to a platform management connectivity fault, according to one or more examples of the present specification.

In block 604, the resiliency controller has a good management interface connection to the platform management system or other management system.

In block 608, the resiliency controller experiences a platform management connectivity fault.

In block 612, the connectivity fault triggers a resiliency policy action for the platform management interface. This may depend on the fault type and the fault severity.

In block 616, the resiliency controller takes a resiliency action responsive to the failure. As necessary, this may include a port switchover, or other port reconfiguration to regain connectivity to the management system.

In block 620, the resiliency controller attempts to notify the management system of the resiliency action. As before, this may be a one-directional message. The use of a one-directional message in this instance is particularly useful, because the identified fault is in the management interface itself. Thus, there is higher danger in this case of the notification becoming a bottleneck if the system waits for an acknowledgement or response from the management system.

In block 624, the resiliency controller determines whether it has successfully reconnected with the platform management system. If reconnection was successful, then in block 604, the platform management system is connected.

If the reconnection was not successful, then in block 628 the resiliency controller may take a management interface-specific failsafe action. This may include disabling ports, or simply reverting to autonomous local mode, wherein the resiliency controller continues to manage VNFs according to the last management policy received, until connectivity is reestablished with the management system.

In block 694, the management interface is in failsafe mode, and the method is done.

FIG. 7 is a block diagram of a hardware dependency graph, according to one or more examples of the present specification. Hardware dependency graph 700 may be generated in some examples by a resiliency controller such as resiliency controller 320 of FIG. 3.

Hardware dependency graph 700 begins with a root node 702, which may for example represent a local platform such as local platform 300 of FIG. 3. Root 702 may be divided into two or more nonuniform memory access (NUMA) nodes 704, in this case specifically NUMA node 0 and NUMA node 1. A NUMA architecture may provide, for example, separate memory for each processor, which can help to ameliorate the performance hit that may occur if a plurality of processors simultaneously try to access a single memory address.

Each NUMA node 704 may be divided into a plurality of components such as DIMMs 708, PCIe devices 712, CPUs 716, and last level caches (LLCs) 720.

For example, NUMA node 0 includes memory banks DIMM 0 through DIMM N, as well as PCIe device x. NUMA node 0 also includes a plurality of CPUs, namely CPU 0 through CPU N. CPU 0 through CPU N may share LLC 0. Note that while a single PCIe device 712, namely PCIe device x, is illustrated in NUMA node 0, this is by way of nonlimiting and illustrative example only, and a plurality of PCIe devices may be provided on any NUMA node 704 as appropriate to the embodiment.

NUMA node 1 includes CPU N+1 through CPU M, which share LLC N. NUMA node 1 also includes PCIe device y, as well as memory banks DIMM N+1 through DIMM M.

Hardware dependency graph 700 allows resiliency controller 300 (FIG. 3) to keep track of which hardware devices are dependent on each other. This can enable the resiliency controller to trace hardware faults.

Figure 8:
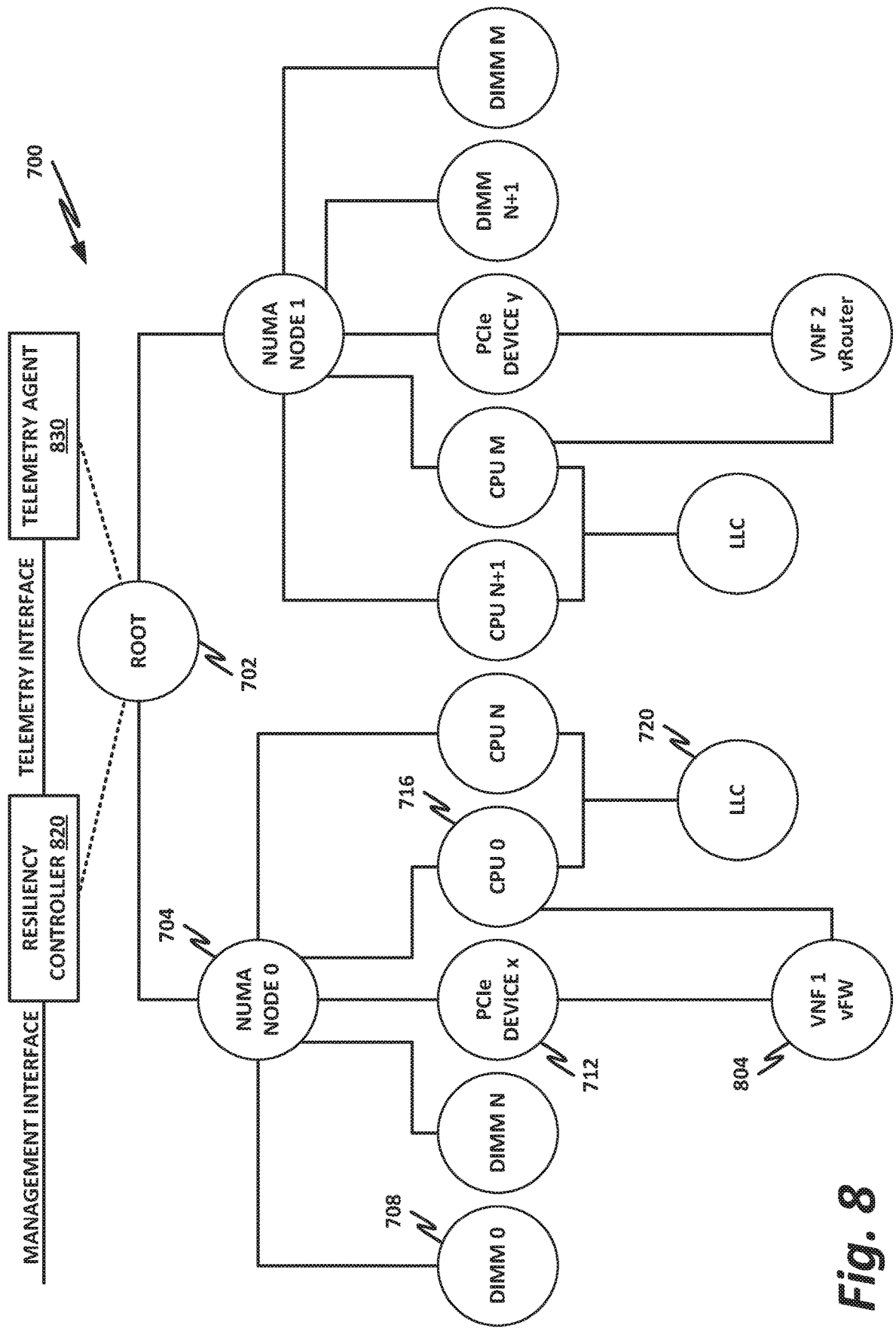
FIG. 8 is a block diagram of virtual network functions hosted on a hardware dependency graph, according to one or more examples of the present specification.

FIG. 8 is a block diagram of virtual network functions hosted on a hardware dependency graph, according to one or more examples of the present specification.

FIG. 8 illustrates that hardware dependency graph 700 may be extended by also graphing which VNFs 804 are hosted on which hardware platforms. For example, in the example of FIG. 8, VNF 1 is hosted on CPU 0, and is also allocated PCIe device x.

Similarly, VNF 2 is hosted on CPU M, and is allocated PCIe device y.

Note that in this example, each VNF 804 is hosted on a single CPU 716, and is allocated a single PCIe device 712, but this is a nonlimiting and illustrative example only. In many cases, a plurality of VNFs may be hosted on a single CPU, while in other cases, a VNF may be allocated a plurality of CPUs. Furthermore, a VNF 804 may have any number of PCIe devices 712, between 0 and the maximum number of PCIe devices supported by the platform.

It should also be noted that the illustration of certain hardware elements on hardware dependency graph 700 is a nonlimiting and illustrative example. The illustration of certain hardware elements on hardware dependency graph 700 does not imply that all of these elements need to be present in every hardware platform, and it should also be understood that some platforms will also host other hardware elements, such as accelerators, coprocessors, and peripheral devices that may be connected via other bus types.

By way of illustration, VNF 1 may be a virtual firewall, while VNF 2 may be a virtual router.

Under normal operating conditions, the status of both VNF 1 and VNF 2 is "green." Each VNF is bound to a socket on the hardware platform. These two VNFs may, for example, pass information via an Intel® Quick-Path Interconnect (QPI) link between the two sockets. As illustrated in FIG. 8, a resiliency controller 820 hosted on the local hardware platform (e.g., at the same logical level as root 702) may communicate with both a management system such as a MANO via a management interface, and may also have a local telemetry interface to communicate with a local telemetry agent 832.

Hardware dependency graph 700 can be used to solve the issue of detecting and associating physical and virtual faults. For example, a QPI failure between CPU M and CPU 0 may result in halving the bandwidth between the two VNFs 804. This results in a status "red," resulting in a warning. From the central MANO perspective, it may appear to be simply a degradation in performance of the VNFs. The MANO may not be able to correlate the hardware QPI failure with the VNF performance degradation or SLA violation. But resiliency controller 820 may receive via telemetry agent 830 information about the failure of the QPI link. Thus, resiliency controller 820 can address the issue with a detailed view or insight into the hardware topology, including mapping the virtual domain (i.e., VNFs 804) to the specific hardware they are running on. Resiliency controller 820 also has an understanding of what a healthy platform is and what is not via the NFVI policies that are provided to it by the management system.

The VNF placement policies for VNFs 804 instantiated on a platform may be pushed from the management system to resiliency controller 820. Another part of the policies passed to resiliency controller 820 may include VNF monitoring parameters. By way of nonlimiting example:

```
monitoring parameter : {
    Name: {presence: required, value: CPU-utilization, },
    Value: {presence: required,
    Action: [60, down, CPU_Low, Scale_Down_Action],
    Action: [85, up, CPU_High, Scale_Up_Action]
    }
}
```

Figure 9:
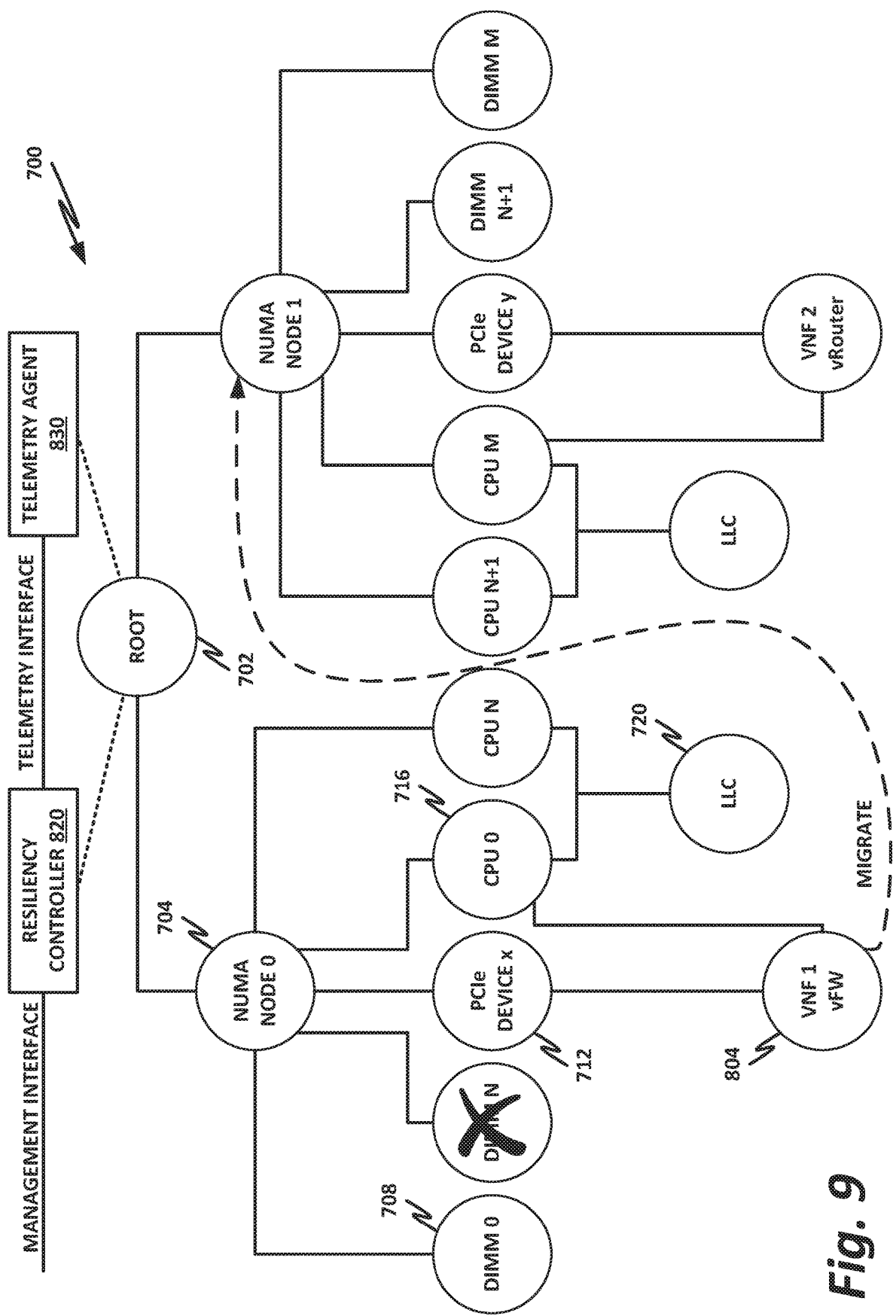
FIGS. 9, 10a, and 10b are examples of resiliency actions taken according to a hardware dependency graph, according to one or more examples of the present specification.
Figure 10A:
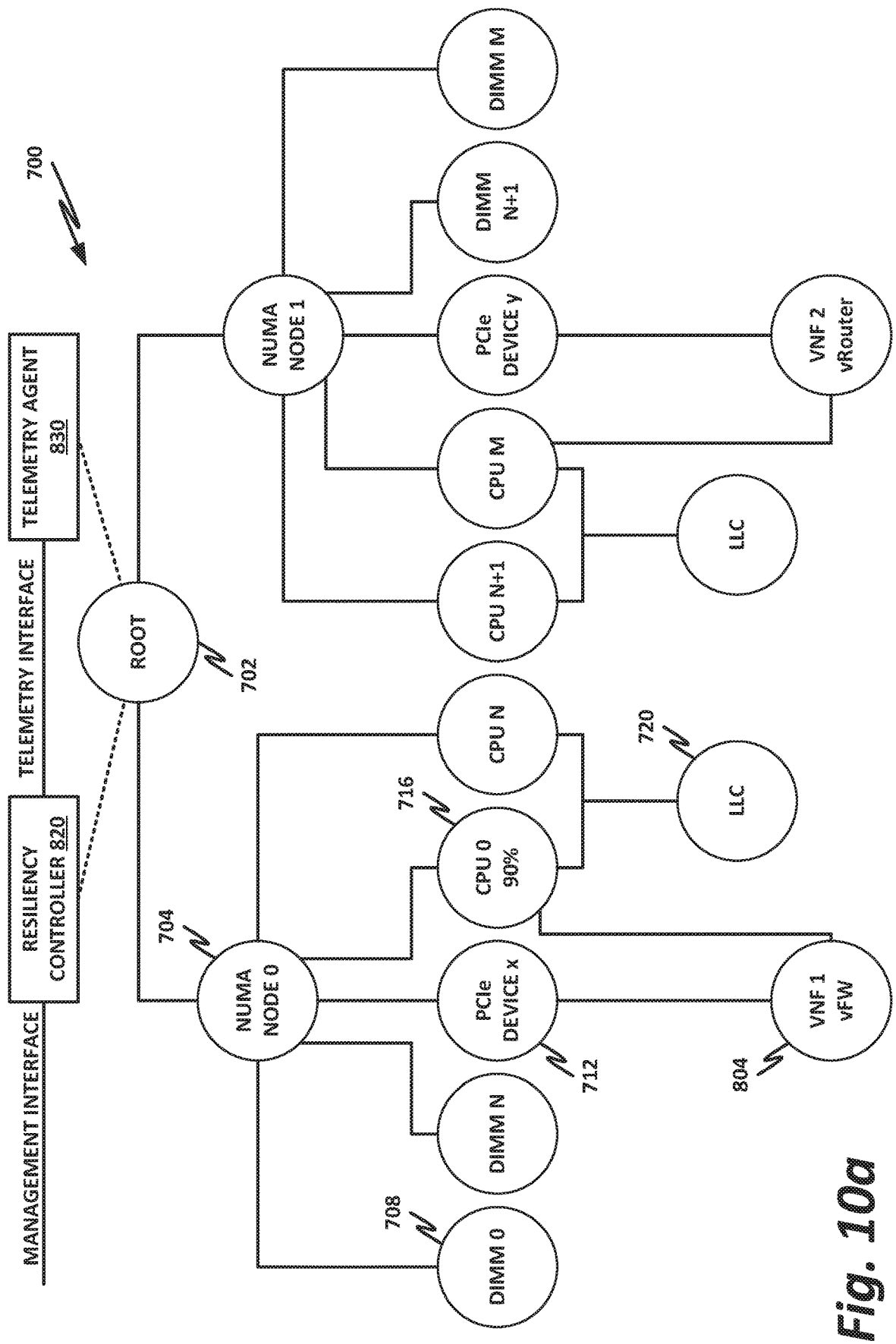
Figure 10B:
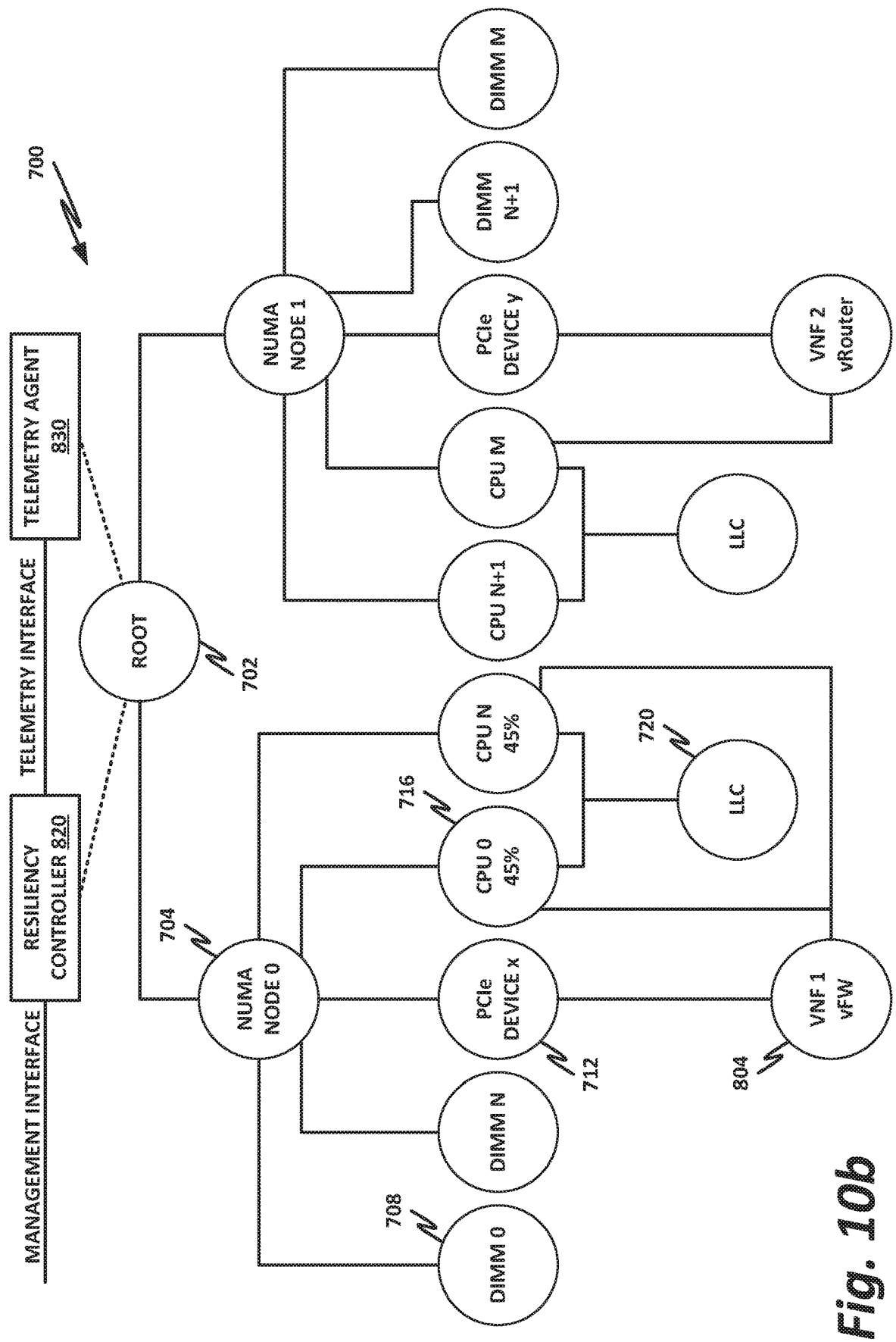

Applications of specific policies are illustrated in FIGS. 9, 10*a*, and 10*b*.

FIGS. 9, 10*a*, and 10*b* are examples of resiliency actions taken according to a hardware dependency graph, according to one or more examples of the present specification.

Turning to FIG. 9, it is illustrated that resiliency controller 820 can use hardware dependency graph 700 to address a specific hardware failure. In this case, DIMM N, which is relied on by CPU 0, goes bad. This may include a complete failure of the DIMM, or a degradation in performance, such as by failure of particular memory blocks, or other partial failure. The failure of DIMM N causes a failure of NUMA node 0. This in turn impacts the performance of VNF 1, which in this example is a virtual firewall.

Because resiliency controller 820 has access to the placement needs and lifecycle management policies for VNF 1, it is able to isolate the failure to NUMA node 0. Resiliency controller 820 may also know the capacity of the hardware platform, and may determine that it is feasible to switch VNF 1 to NUMA node 1. Advantageously, resiliency controller 820 may be able to migrate VNF 1 to NUMA node 1 before any noticeable performance impact occurs for VNF 1.

FIGS. 10*a* and 10*b* illustrate an example of a scale up action according to one or more examples of the present specification. The scale up action of FIGS. 10*a* and 10*b* may take place when resiliency controller 820 identifies that VNF 1 has exceeded a threshold for CPU usage on CPU 0. Specifically, resiliency controller 820 determines that CPU 0 is running at 90% capacity. Resiliency controller 820 previously received a management policy via the management interface. The management policy specified that when a CPU exceeds 85% utilization, the resiliency controller 820 is to take a scale up action. Thus, as illustrated in FIG. 10*b*, resiliency controller 820 allocates both CPU 0 and CPU N to VNF 1. Because VNF 1 now has two CPUs allocated to it, each CPU is utilized at only 45%. Note that the management policy also specified that a CPU with under 60% utilization is underutilized. But resiliency policy 820 includes sufficient intelligence to determine that, although both CPUs are underutilized at 45%, deallocating one of the CPUs would cause the remaining CPU to be overutilized at 90%. Thus, resiliency controller 820 does not deallocate either CPU for VNF 1. However, resiliency controller 820 may determine that one or both CPUs have sufficient remaining capacity that they may host some other VNF or other virtual function. Particularly, a lightweight VNF may be additionally hosted on either CPU, which allows both CPUs to realize optimal utilization.

Figure 11:
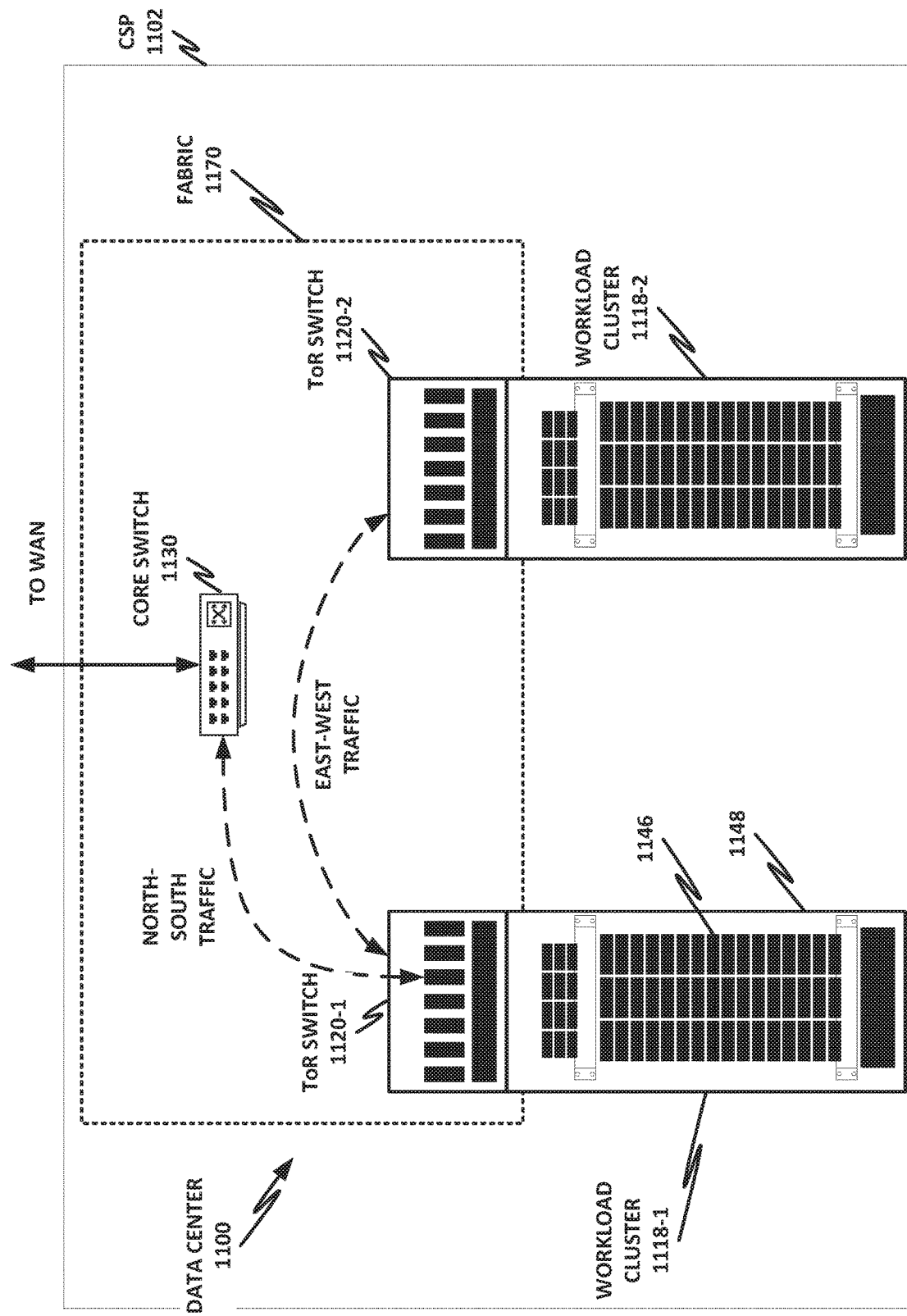
FIG. 11 is a block diagram of selected components of a data center with network connectivity, according to one or more examples of the present application.

FIG. 11 is a block diagram of selected components of a data center with connectivity to network 1100 of a CSP 1102, according to one or more examples of the present specification. Embodiments of network 1100 disclosed herein may be adapted or configured to provide the method of providing localized service resiliency according to the teachings of the present specification. CSP 1102 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 1102 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 1102 may provision some number of workload clusters 1118, which may be clusters of individual servers, blade servers, rackmount servers, or any other suitable server topology. In this illustrative example, two workload clusters, 1118-1 and 1118-2 are shown, each providing rackmount servers 1146 in a chassis 1148.

In this illustration, workload clusters 1118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 1146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 1146 may be specifically dedicated to certain enterprise clients or tenants, while others may be shared.

The various devices in a data center may be connected to each other via a switching fabric 1170, which may include one or more high speed routing and/or switching devices. Switching fabric 1170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 1146 increases, traffic volume may further increase. For example, each server 1146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 1170 may be provided. Switching fabric 1170 is illustrated in this example as a "flat" network, wherein each server 1146 may have a direct connection to a top-of-rack (ToR) switch 1120 (e.g., a "star" configuration), and each ToR switch 1120 may couple to a core switch 1130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 1146 may include an Intel® Host Fabric Interface (HFI), a NIC, a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 1170. In other embodiments, the Ultra Path Interconnect (UPI) or other local coherent interconnect may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 1120, and optical cabling provides relatively longer connections to core switch 1130. Interconnect technologies that may be found in the data center include, by way of nonlimiting example, Intel® Omni-Path™ Architecture (OPA), TrueScale™, UPI (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in HPC applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 1170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 1170.

In certain embodiments, fabric 1170 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 12:
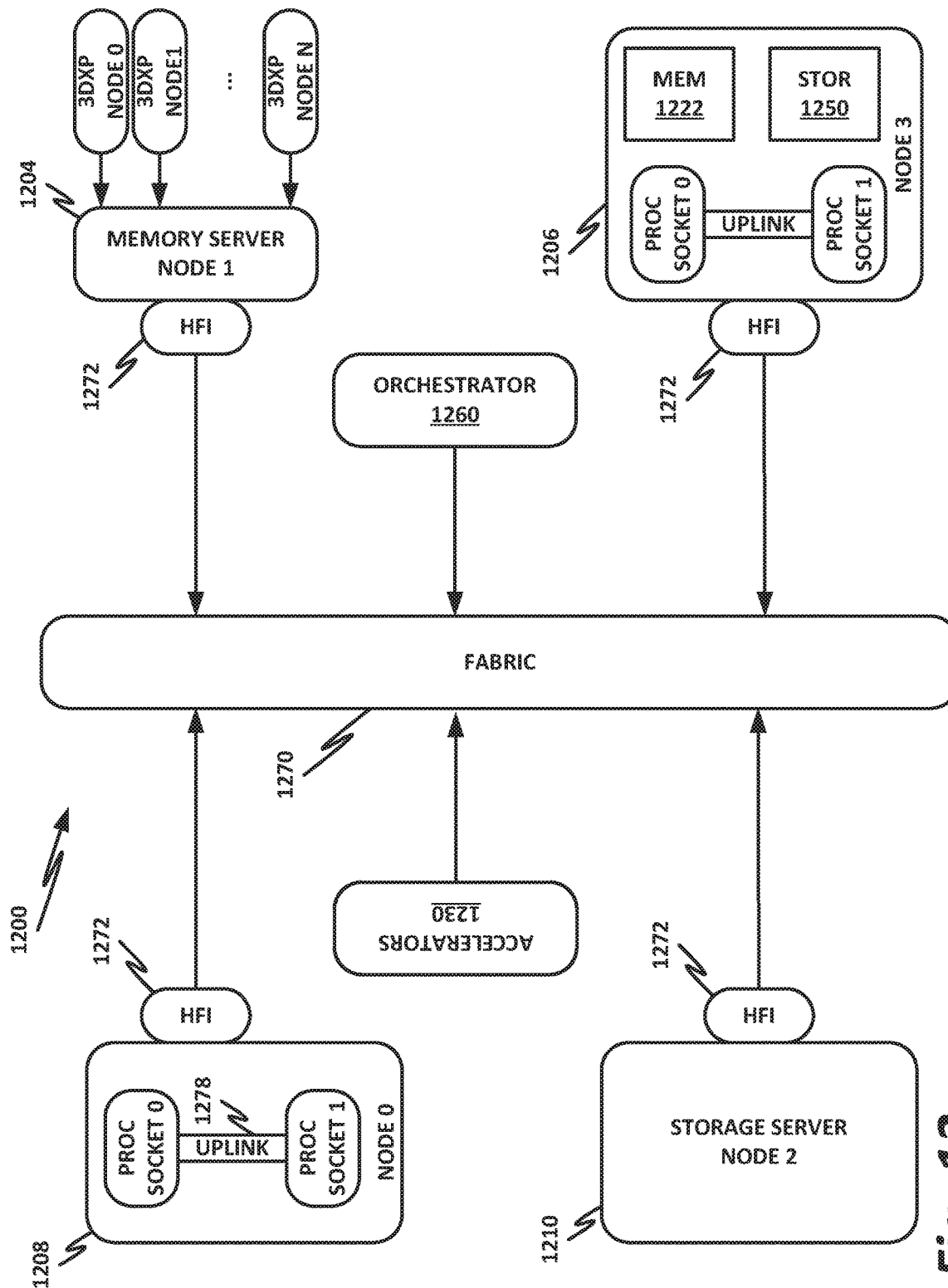
FIG. 12 is a block diagram of selected components of an end-user computing device, according to one or more examples of the present specification.

FIG. 12 is a block diagram of selected components of an end-user computing device 1200, according to one or more examples of the present specification. Embodiments of computing device 1200 disclosed herein may be adapted or configured to provide the method of providing localized service resiliency according to the teachings of the present specification. As above, computing device 1200 may provide, as appropriate, cloud service, HPC, telecommunication services, enterprise data center services, or any other compute services that benefit from a computing device 1200.

In this example, a fabric 1270 is provided to interconnect various aspects of computing device 1200. Fabric 1270 may be the same as fabric 1170 of FIG. 11, or may be a different fabric. As above, fabric 1270 may be provided by any suitable interconnect technology. In this example, Intel® Omni-Path™ is used as an illustrative and nonlimiting example.

As illustrated, computing device 1200 includes a number of logic elements forming a plurality of nodes. It should be understood that each node may be provided by a physical server, a group of servers, or other hardware. Each server may be running one or more virtual machines as appropriate to its application.

Node 0 1208 is a processing node including a processor socket 0 and processor socket 1. The processors may be, for example, Intel® Xeon™ processors with a plurality of cores, such as 4 or 8 cores. Node 0 1208 may be configured to provide network or workload functions, such as by hosting a plurality of virtual machines or virtual appliances.

Onboard communication between processor socket 0 and processor socket 1 may be provided by an onboard uplink 1278. This may provide a very high speed, short-length interconnect between the two processor sockets, so that virtual machines running on node 0 1208 can communicate with one another at very high speeds. To facilitate this communication, a virtual switch (vSwitch) may be provisioned on node 0 1208, which may be considered to be part of fabric 1270.

Node 0 1208 connects to fabric 1270 via an HFI 1272. HFI 1272 may connect to an Intel® Omni-Path™ fabric. In some examples, communication with fabric 1270 may be tunneled, such as by providing UPI tunneling over Omni-Path™.

Because computing device 1200 may provide many functions in a distributed fashion that in previous generations were provided onboard, a highly capable HFI 1272 may be provided. HFI 1272 may operate at speeds of multiple gigabits per second, and in some cases may be tightly coupled with node 0 1208. For example, in some embodiments, the logic for HFI 1272 is integrated directly with the processors on a system-on-a-chip. This provides very high speed communication between HFI 1272 and the processor sockets, without the need for intermediary bus devices, which may introduce additional latency into the fabric. However, this is not to imply that embodiments where HFI 1272 is provided over a traditional bus are to be excluded. Rather, it is expressly anticipated that in some examples, HFI 1272 may be provided on a bus, such as a PCIe bus, which is a serialized version of PCI that provides higher speeds than traditional PCI. Throughout computing device 1200, various nodes may provide different types of HFIs 1272, such as onboard HFIs and plug-in HFIs. It should also be noted that certain blocks in an SoC may be provided as IP blocks that can be "dropped" into an integrated circuit as a modular unit. Thus, HFI 1272 may in some cases be derived from such an IP block.

Note that in "the network is the device" fashion, node 0 1208 may provide limited or no onboard memory or storage. Rather, node 0 1208 may rely primarily on distributed services, such as a memory server and a networked storage server. Onboard, node 0 1208 may provide only sufficient memory and storage to bootstrap the device and get it communicating with fabric 1270. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 1204 and a node 2 storage server 1210 provide the operational memory and storage capabilities of node 0 1208. For example, memory server node 1 1204 may provide remote direct memory access (RDMA), whereby node 0 1208 may access memory resources on node 1 1204 via fabric 1270 in a direct memory access fashion, similar to how it would access its own onboard memory. The memory provided by memory server 1204 may be traditional memory, such as double data rate type 3 (DDR3), DRAM, which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 1208, a storage server node 2 1210 may be provided. Storage server 1210 may provide a networked bunch of disks (NBOD), PFM, redundant array of independent disks (RAID), redundant array of independent nodes (RAIN), network-attached storage (NAS), optical storage, tape drives, or other nonvolatile memory solutions.

Thus, in performing its designated function, node 0 1208 may access memory from memory server 1204 and store results on storage provided by storage server 1210. Each of these devices couples to fabric 1270 via a HFI 1272, which provides fast communication that makes these technologies possible.

By way of further illustration, node 3 1206 is also depicted. Node 3 1206 also includes a HFI 1272, along with two processor sockets internally connected by an uplink. However, unlike node 0 1208, node 3 1206 includes its own onboard memory 1222 and storage 1250. Thus, node 3 1206 may be configured to perform its functions primarily onboard, and may not be required to rely upon memory server 1204 and storage server 1210. However, in appropriate circumstances, node 3 1206 may supplement its own onboard memory 1222 and storage 1250 with distributed resources similar to node 0 1208.

Computing device 1200 may also include accelerators 1230. These may provide various accelerated functions, including hardware or co-processor acceleration for functions such as packet processing, encryption, decryption, compression, decompression, network security, or other accelerated functions in the data center. In some examples, accelerators 1230 may include deep learning accelerators that may be directly attached to one or more cores in nodes such as node 0 1208 or node 3 1206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, FPGA, co-processor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

Figure 13:
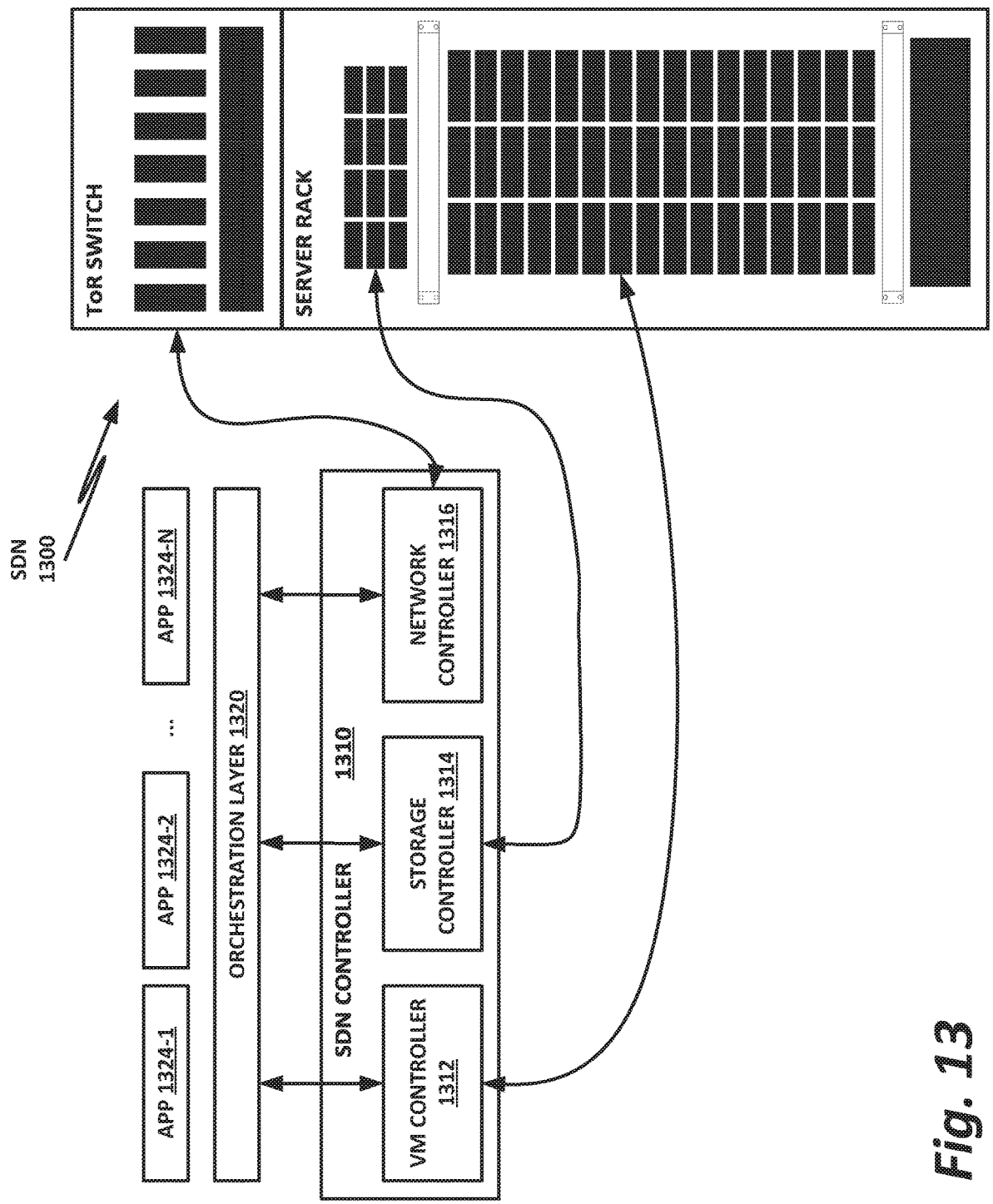
FIG. 13 is a block diagram of a software defined network (SDN), according to one or more examples of the present specification.

FIG. 13 is a block diagram of a software defined network 1300, according to one or more examples of the present specification. Embodiments of software defined network 1300 disclosed herein may be adapted or configured to provide the method of providing localized service resiliency according to the teachings of the present specification. In software defined networking (SDN), a single configuration utility (often a graphical interface or browser interface) may be used to manage network resources at a high level, with very little manual human intervention into the details of the network. SDN may provide a data plane that is separate from a control plane, to separate management functions from data functions. Another benefit of SDNs is that they may be based on open standards, thus providing portability between systems, and alleviating issues of vendor lock-in.

SDN 1300 is controlled by an SDN controller 1310, which may include, for example, a VM controller 1312, a storage controller 1314, and a network controller 1316. Other SDN controller functions may also be provided in other embodiments, and not every embodiments is required to have the foregoing elements. SDN controller 1310 provides an orchestration layer 1320. The orchestration layer may employ an open orchestration protocol, such as the OpenStack cloud operating system.

Orchestration layer 1320 may include various plug-in components that can be used as interfaces to control data center resources. These plugins may interact with orchestration layer 1320 via a set of standardized and open APIs, thus enabling different vendors to provide different plugins. In many cases, data center resources can all be managed via a single graphical interface provided by orchestration layer 1320. For example, OpenStack currently provides a dashboard called "Horizon," which provides a monolithic interface that enables an administrator to fully configure and administer a data center.

In some embodiments, orchestration layer 1320 provides a northbound API, on which may be instantiated various applications or functions, such as applications 1324-1-1324-N illustrated here. Each application 1324 may be provided on a discrete virtual network device or container (referred to herein generically as "network devices"). Applications 1324 may be configured to perform a variety of network functions, such as, by way of nonlimiting example, load-balancing, firewall, DPI, DNS, antivirus, or any other suitable network function. The particular arrangement of interconnections between network devices 1330 and from network devices 1330 to host devices 1340 may be determined by the particular network configuration and needs. Thus, the specific configuration of FIG. 13 should be understood to be an illustrative example only.

Orchestration layer may provide communication protocols, including in some embodiments OpenFlow. OpenFlow centralizes networking intelligence into an SDN controller such as SDN controller 1310. Using OpenFlow, switches and routers do not need to use prior data exchange protocols to learn about the network topology and other environmental factors. These topology data are replicated across all switches and routers in the network, and each one maintains forwarding tables. In contrast, an OpenFlow controller (which may be, for example, a function of network controller 1316) provides centralized network management that maintains the network state in a central repository. Network controller 1316 can then update forwarding tables as the network topology evolves or changes, generate a forwarding table for each switch or router, and push them out to network devices as necessary. This realizes separation of the control plane and the data plane. Individual network devices may implement the OpenFlow API by adding an OpenFlow shim layer that translates OpenFlow API function calls into native function calls for the switch or router.

Note that while this illustration shows a single SDN controller 1310, in large data centers, an orchestration controller may control a number of distributed SDN controllers. In some embodiments, SDN controllers and orchestrators can communicate with one another to remain synchronization and state information via a sideband, such as a separate, lower-speed Ethernet connection.

Figure 14:
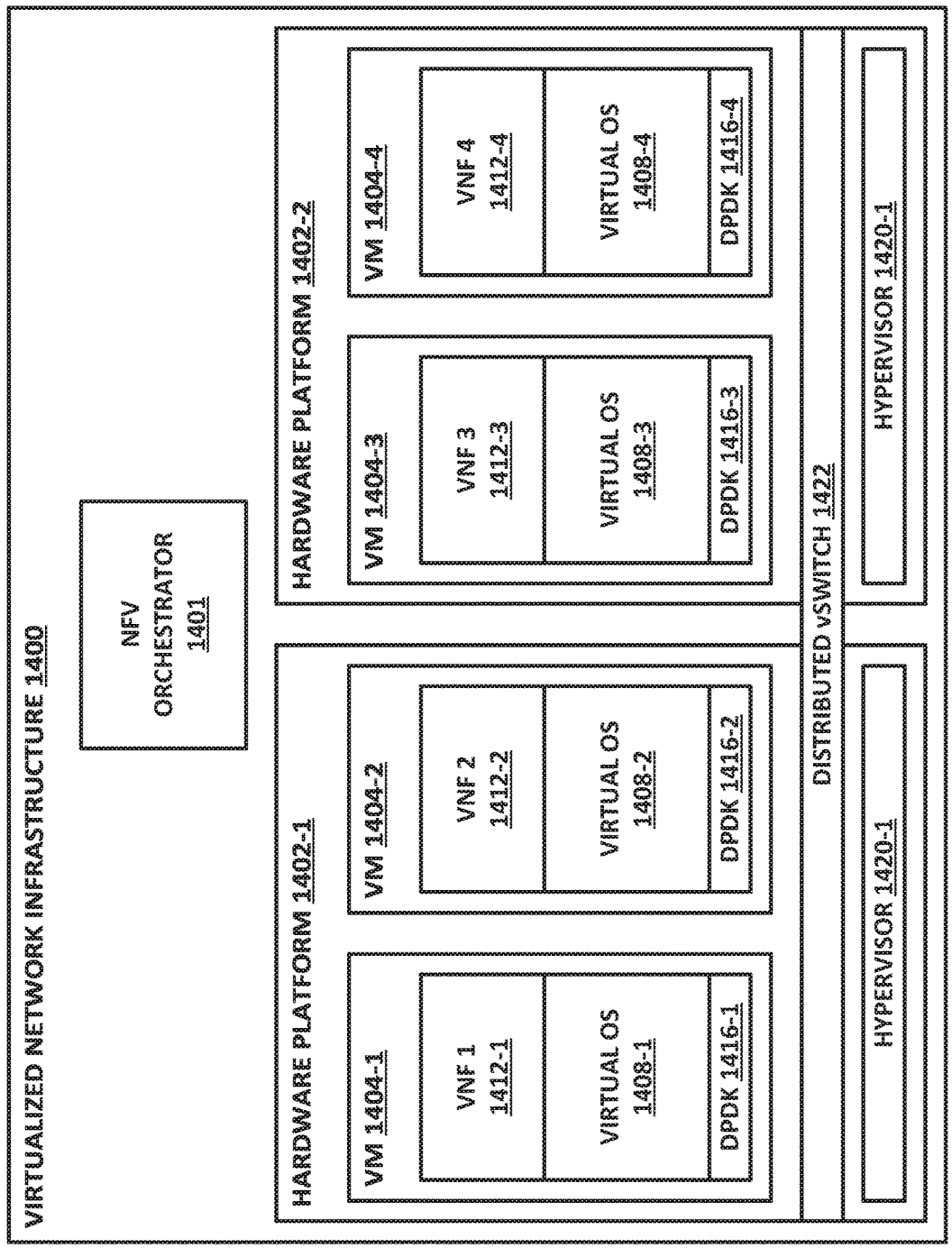
FIG. 14 is a block diagram of an NFV architecture, according to one or more examples of the present specification.

FIG. 14 is a block diagram of a network function virtualization (NFV) infrastructure 1400, according to one or more examples of the present specification. Embodiments of NFV infrastructure 1400 disclosed herein may be adapted or configured to provide the method of providing localized service resiliency according to the teachings of the present specification. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or DPI appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are in-line service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. Thus, the network as illustrated in FIG. 14 may be defined instead of or in addition to the network of FIG. 13. In other words, certain portions of the network may rely on SDN, while other portions (or the same portions) may rely on NFV.

In the example of FIG. 14, an NFV orchestrator 1401 manages a number of the VNFs 1412 running on an NFVI 1400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1401 a valuable system resource. Note that NFV orchestrator 1401 may provide a browser-based or graphical configuration interface, and in some embodiments may be integrated with SDN orchestration functions.

Note that NFV orchestrator 1401 itself may be virtualized (rather than a special-purpose hardware appliance). NFV orchestrator 1401 may be integrated within an existing SDN system, wherein an operations support system (OSS) manages the SDN. This may interact with cloud resource management systems (e.g., OpenStack) to provide NFV orchestration. An NFVI 1400 may include the hardware, software, and other infrastructure to enable VNFs to run. This may include a hardware platform 1402 on which one or more VMs 1404 may run. For example, hardware platform 1402-1 in this example runs VMs 1404-1 and 1404-2. Hardware platform 1402-2 runs VMs 1404-3 and 1404-4. Each hardware platform may include a hypervisor 1420, VMM, or similar function, which may include and run on a native (bare metal) operating system, which may be minimal so as to consume very few resources.

Hardware platforms 1402 may be or comprise a rack or several racks of blade or slot servers (including, e.g., processors, memory, and storage), one or more data centers, other hardware resources distributed across one or more geographic locations, hardware switches, or network interfaces. An NFVI 1400 may also include the software architecture that enables hypervisors to run and be managed by NFV orchestrator 1401.

Running on NFVI 1400 are a number of VMs 1404, each of which in this example is a VNF providing a virtual service appliance. Each VM 1404 in this example includes an instance of the Data Plane Development Kit (DVDK), a virtual operating system 1408, and an application providing the VNF 1412.

Virtualized network functions could include, as nonlimiting and illustrative examples, firewalls, intrusion detection systems, load balancers, routers, session border controllers, DPI services, network address translation (NAT) modules, or call security association.

The illustration of FIG. 14 shows that a number of VNFs 1404 have been provisioned and exist within NFVI 1400. This figure does not necessarily illustrate any relationship between the VNFs and the larger network, or the packet flows that NFVI 1400 may employ.

The illustrated Data Plane Development Kit (DPDK) instances 1416 provide a set of highly-optimized libraries for communicating across a virtual switch (vSwitch) 1422. Like VMs 1404, vSwitch 1422 is provisioned and allocated by a hypervisor 1420. The hypervisor uses a network interface to connect the hardware platform to the data center fabric (e.g., an HFI). This HFI may be shared by all VMs 1404 running on a hardware platform 1402. Thus, a vSwitch may be allocated to switch traffic between VMs 1404. The vSwitch may be a pure software vSwitch (e.g., a shared memory vSwitch), which may be optimized so that data are not moved between memory locations, but rather, the data may stay in one place, and pointers may be passed between VMs 1404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1422 is illustrated, wherein vSwitch 1422 is shared between two or more physical hardware platforms 1402.

Figure 15:
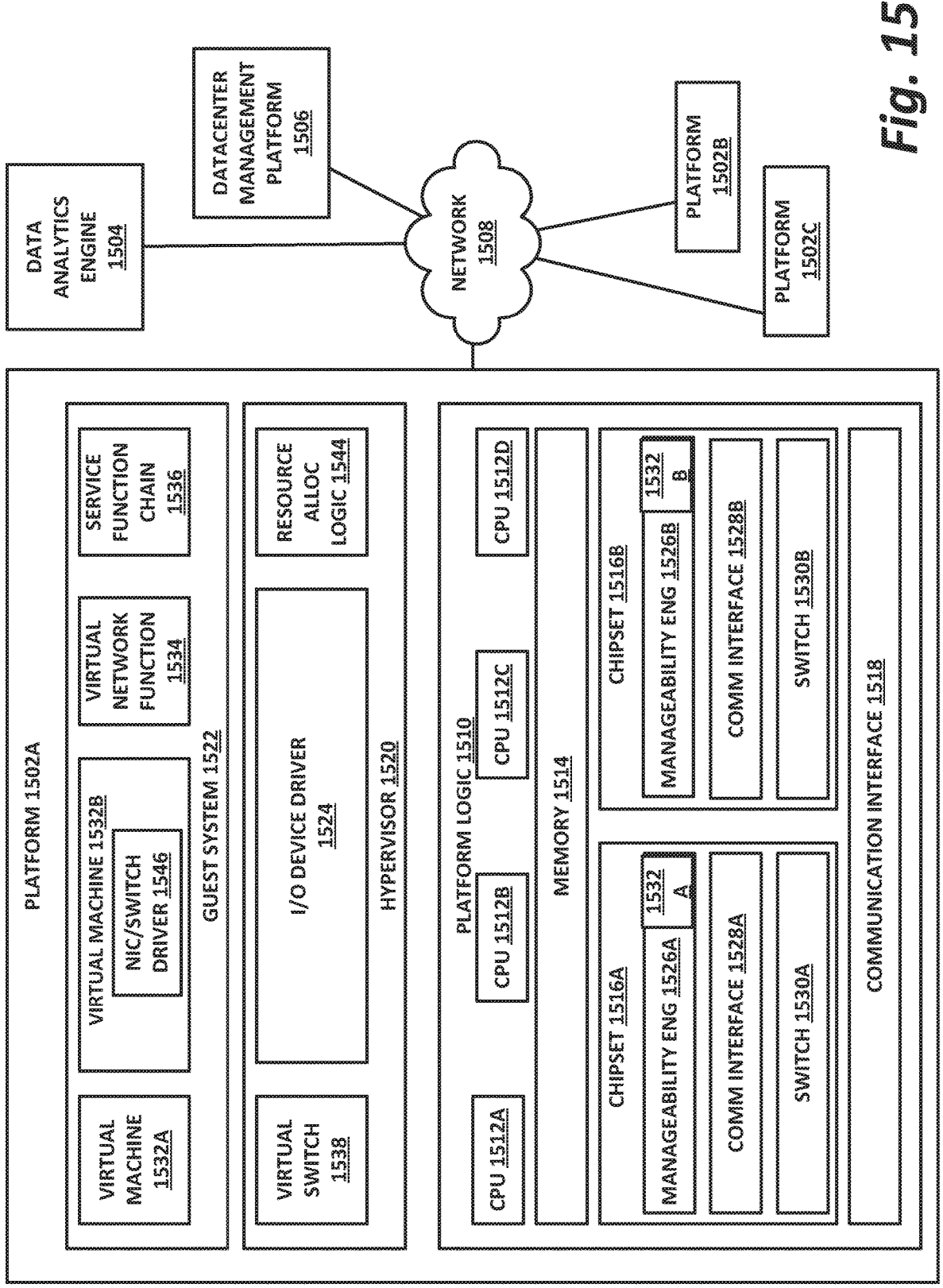
FIG. 15 is a block diagram of components of a computing platform, according to one or more examples of the present specification.

FIG. 15 is a block diagram of components of a computing platform 1502A, according to one or more examples of the present specification. Embodiments of computing platform 1502A disclosed herein may be adapted or configured to provide the method of providing localized service resiliency according to the teachings of the present specification. In the embodiment depicted, platforms 1502A, 1502B, and 1502C, along with a data center management platform 1506 and data analytics engine 1504 are interconnected via network 1508. In other embodiments, a computer system may include any suitable number of (i.e., one or more) platforms. In some embodiments (e.g., when a computer system only includes a single platform), all or a portion of the system management platform 1506 may be included on a platform 1502. A platform 1502 may include platform logic 1510 with one or more CPUs 1512, memories 1514 (which may include any number of different modules), chipsets 1516, communication interfaces 1518, and any other suitable hardware and/or software to execute a hypervisor 1520 or other operating system capable of executing workloads associated with applications running on platform 1502. In some embodiments, a platform 1502 may function as a host platform for one or more guest systems 1522 that invoke these applications. Platform 1502A may represent any suitable computing environment, such as an HPC environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1506, hypervisor 1520, or other operating system) of computer platform 1502A may assign hardware resources of platform logic 1510 to perform workloads in accordance with the stress information. In some embodiments, self-diagnostic capabilities may be combined with the stress monitoring to more accurately determine the health of the hardware resources. Each platform 1502 may include platform logic 1510. Platform logic 1510 comprises, among other logic enabling the functionality of platform 1502, one or more CPUs 1512, memory 1514, one or more chipsets 1516, and communication interfaces 1528. Although three platforms are illustrated, computer platform 1502A may be interconnected with any suitable number of platforms. In various embodiments, a platform 1502 may reside on a circuit board that is installed in a chassis, rack, or other suitable structure that comprises multiple platforms coupled together through network 1508 (which may comprise, e.g., a rack or backplane switch).

CPUs 1512 may each comprise any suitable number of processor cores and supporting logic (e.g., uncores). The cores may be coupled to each other, to memory 1514, to at least one chipset 1516, and/or to a communication interface 1518, through one or more controllers residing on CPU 1512 and/or chipset 1516. In particular embodiments, a CPU 1512 is embodied within a socket that is permanently or removably coupled to platform 1502A. Although four CPUs are shown, a platform 1502 may include any suitable number of CPUs.

Memory 1514 may comprise any form of volatile or nonvolatile memory including, without limitation, magnetic media (e.g., one or more tape drives), optical media, random access memory (RAM), ROM, flash memory, removable media, or any other suitable local or remote memory component or components. Memory 1514 may be used for short, medium, and/or long term storage by platform 1502A. Memory 1514 may store any suitable data or information utilized by platform logic 1510, including software embedded in a computer-readable medium, and/or encoded logic incorporated in hardware or otherwise stored (e.g., firmware). Memory 1514 may store data that is used by cores of CPUs 1512. In some embodiments, memory 1514 may also comprise storage for instructions that may be executed by the cores of CPUs 1512 or other processing elements (e.g., logic resident on chipsets 1516) to provide functionality associated with the manageability engine 1526 or other components of platform logic 1510. A platform 1502 may also include one or more chipsets 1516 comprising any suitable logic to support the operation of the CPUs 1512. In various embodiments, chipset 1516 may reside on the same die or package as a CPU 1512 or on one or more different dies or packages. Each chipset may support any suitable number of CPUs 1512. A chipset 1516 may also include one or more controllers to couple other components of platform logic 1510 (e.g., communication interface 1518 or memory 1514) to one or more CPUs. In the embodiment depicted, each chipset 1516 also includes a manageability engine 1526. Manageability engine 1526 may include any suitable logic to support the operation of chipset 1516. In a particular embodiment, a manageability engine 1526 (which may also be referred to as an Intel® Innovation Engine) is capable of collecting real-time telemetry data from the chipset 1516, the CPU(s) 1512 and/or memory 1514 managed by the chipset 1516, other components of platform logic 1510, and/or various connections between components of platform logic 1510. In various embodiments, the telemetry data collected includes the stress information described herein.

In various embodiments, a manageability engine 1526 operates as an out-of-band asynchronous compute agent which is capable of interfacing with the various elements of platform logic 1510 to collect telemetry data with no or minimal disruption to running processes on CPUs 1512. For example, manageability engine 1526 may comprise a dedicated processing element (e.g., a processor, controller, or other logic) on chipset 1516, which provides the functionality of manageability engine 1526 (e.g., by executing software instructions), thus conserving processing cycles of CPUs 1512 for operations associated with the workloads performed by the platform logic 1510. Moreover the dedicated logic for the manageability engine 1526 may operate asynchronously with respect to the CPUs 1512 and may gather at least some of the telemetry data without increasing the load on the CPUs.

A manageability engine 1526 may process telemetry data it collects (specific examples of the processing of stress information will be provided herein). In various embodiments, manageability engine 1526 reports the data it collects and/or the results of its processing to other elements in the computer system, such as one or more hypervisors 1520 or other operating systems and/or system management software (which may run on any suitable logic such as system management platform 1506). In particular embodiments, a critical event such as a core that has accumulated an excessive amount of stress may be reported prior to the normal interval for reporting telemetry data (e.g., a notification may be sent immediately upon detection).

Additionally, manageability engine 1526 may include programmable code configurable to set which CPU(s) 1512 a particular chipset 1516 will manage and/or which telemetry data will be collected.

Chipsets 1516 also each include a communication interface 1528. Communication interface 1528 may be used for the communication of signaling and/or data between chipset 1516 and one or more I/O devices, one or more networks 1508, and/or one or more devices coupled to network 1508 (e.g., system management platform 1506). For example, communication interface 1528 may be used to send and receive network traffic such as data packets. In a particular embodiment, a communication interface 1528 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1516 (e.g., manageability engine 1526 or switch 1530) and another device coupled to network 1508. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1528 may allow communication of data (e.g., between the manageability engine 1526 and the data center management platform 1506) associated with management and monitoring functions performed by manageability engine 1526. In various embodiments, manageability engine 1526 may utilize elements (e.g., one or more NICs) of communication interfaces 1528 to report the telemetry data (e.g., to system management platform 1506) in order to reserve usage of NICs of communication interface 1518 for operations associated with workloads performed by platform logic 1510.

Switches 1530 may couple to various ports (e.g., provided by NICs) of communication interface 1528 and may switch data between these ports and various components of chipset 1516 (e.g., one or more Peripheral Component Interconnect Express (PCIe) lanes coupled to CPUs 1512). Switches 1530 may be a physical or virtual (i.e., software) switch.

Platform logic 1510 may include an additional communication interface 1518. Similar to communication interfaces 1528, communication interfaces 1518 may be used for the communication of signaling and/or data between platform logic 1510 and one or more networks 1508 and one or more devices coupled to the network 1508. For example, communication interface 1518 may be used to send and receive network traffic such as data packets. In a particular embodiment, communication interfaces 1518 comprise one or more physical NICs. These NICs may enable communication between any suitable element of platform logic 1510 (e.g., CPUs 1512 or memory 1514) and another device coupled to network 1508 (e.g., elements of other platforms or remote computing devices coupled to network 1508 through one or more networks).

Platform logic 1510 may receive and perform any suitable types of workloads. A workload may include any request to utilize one or more resources of platform logic 1510, such as one or more cores or associated logic. For example, a workload may comprise a request to instantiate a software component, such as an I/O device driver 1524 or guest system 1522; a request to process a network packet received from a virtual machine 1532 or device external to platform 1502A (such as a network node coupled to network 1508); a request to execute a process or thread associated with a guest system 1522, an application running on platform 1502A, a hypervisor 1520 or other operating system running on platform 1502A; or other suitable processing request.

A virtual machine 1532 may emulate a computer system with its own dedicated hardware. A virtual machine 1532 may run a guest operating system on top of the hypervisor 1520. The components of platform logic 1510 (e.g., CPUs 1512, memory 1514, chipset 1516, and communication interface 1518) may be virtualized such that it appears to the guest operating system that the virtual machine 1532 has its own dedicated components.

A virtual machine 1532 may include a virtualized NIC (vNIC), which is used by the virtual machine as its network interface. A vNIC may be assigned a media access control (MAC) address or other identifier, thus allowing multiple virtual machines 1532 to be individually addressable in a network.

VNF 1534 may comprise a software implementation of a functional building block with defined interfaces and behavior that can be deployed in a virtualized infrastructure. In particular embodiments, a VNF 1534 may include one or more virtual machines 1532 that collectively provide specific functionalities (e.g., WAN optimization, virtual private network (VPN) termination, firewall operations, load-balancing operations, security functions, etc.). A VNF 1534 running on platform logic 1510 may provide the same functionality as traditional network components implemented through dedicated hardware. For example, a VNF 1534 may include components to perform any suitable NFV workloads, such as virtualized evolved packet core (vEPC) components, mobility management entities, 3rd Generation Partnership Project (3GPP) control and data plane components, etc.

SFC 1536 is a group of VNFs 1534 organized as a chain to perform a series of operations, such as network packet processing operations. Service function chaining may provide the ability to define an ordered list of network services (e.g. firewalls, load balancers) that are stitched together in the network to create a service chain.

A hypervisor 1520 (also known as a virtual machine monitor) may comprise logic to create and run guest systems 1522. The hypervisor 1520 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1510. Services of hypervisor 1520 may be provided by virtualizing in software or through hardware assisted resources that require minimal software intervention, or both. Multiple instances of a variety of guest operating systems may be managed by the hypervisor 1520. Each platform 1502 may have a separate instantiation of a hypervisor 1520.

Hypervisor 1520 may be a native or bare metal hypervisor that runs directly on platform logic 1510 to control the platform logic and manage the guest operating systems. Alternatively, hypervisor 1520 may be a hosted hypervisor that runs on a host operating system and abstracts the guest operating systems from the host operating system. Hypervisor 1520 may include a virtual switch 1538 that may provide virtual switching and/or routing functions to virtual machines of guest systems 1522. The virtual switch 1538 may comprise a logical switching fabric that couples the vNICs of the virtual machines 1532 to each other, thus creating a virtual network through which virtual machines may communicate with each other.

Virtual switch 1538 may comprise a software element that is executed using components of platform logic 1510. In various embodiments, hypervisor 1520 may be in communication with any suitable entity (e.g., a SDN controller) which may cause hypervisor 1520 to reconfigure the parameters of virtual switch 1538 in response to changing conditions in platform 1502 (e.g., the addition or deletion of virtual machines 1532 or identification of optimizations that may be made to enhance performance of the platform).

Hypervisor 1520 may also include resource allocation logic 1544, which may include logic for determining allocation of platform resources based on the telemetry data (which may include stress information). Resource allocation logic 1544 may also include logic for communicating with various components of platform logic 1510 entities of platform 1502A to implement such optimization, such as components of platform logic 1510.

Any suitable logic may make one or more of these optimization decisions. For example, system management platform 1506; resource allocation logic 1544 of hypervisor 1520 or other operating system; or other logic of computer platform 1502A may be capable of making such decisions. In various embodiments, the system management platform 1506 may receive telemetry data from and manage workload placement across multiple platforms 1502. The system management platform 1506 may communicate with hypervisors 1520 (e.g., in an out-of-band manner) or other operating systems of the various platforms 1502 to implement workload placements directed by the system management platform.

The elements of platform logic 1510 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

As used in the present specification, cache coherency is a memory architecture that provides uniform sharing and mapping between a plurality of caches. For example, the caches may map to the same address space. If two different caches have cached the same address in the shared address space, a coherency agent provides logic (hardware and/or software) to ensure the compatibility and uniformity of shared resource. For example, if two caches have cached the same address, when the value stored in that address is updated in one cache, the coherency agent ensures that the change is propagated to the other cache. Coherency may be maintained, for example, via "snooping," wherein each cache monitors the address lines of each other cache, and detects updates. Cache coherency may also be maintained via a directory-based system, in which shared data are placed in a shared directory that maintains coherency. Some distributed shared memory architectures may also provide coherency, for example by emulating the foregoing mechanisms.

Coherency may be either "snoopy" or directory-based. In snoopy protocols, coherency may be maintained via write-invalidate, wherein a first cache that snoops a write to the same address in a second cache invalidates its own copy. This forces a read from memory if a program tries to read the value from the first cache. Alternatively, in write-update, a first cache snoops a write to a second cache, and a cache controller (which may include a coherency agent) copies the data out and updates the copy in the first cache.

By way of nonlimiting example, current cache coherency models include MSI (modified, shared, invalid), MESI (modified, exclusive, shared, invalid), MOSI (modified, owned, shared, invalid), MOESI (modified, owned, exclusive, shared, invalid), MERSI (modified, exclusive, read-only or recent, shared, invalid), MESIF (modified, exclusive, shared, invalid, forward), write-once, Synapse, Berkeley, Firefly, and Dragon protocols. Furthermore, ARM processors may use advanced microcontroller bus architecture (AMBA), including AMBA 4 ACE, to provide cache coherency in systems-on-a-chip (SoCs) or elsewhere.

Elements of the computer platform 1502A may be coupled together in any suitable manner such as through one or more networks 1508. A network 1508 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically-coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations The following examples are provided by way of illustration.

Example 1 includes a computing apparatus, comprising: a local platform including a hardware platform; a management interface to communicatively couple the local platform to a management controller; a virtualization infrastructure to operate on the hardware platform and to provide a local virtualized function; and a resiliency controller to operate on the hardware platform, and configured to: receive a resiliency policy from the management controller via the management interface, the resiliency policy comprising information to handle a fault in the virtualized function; detect a fault in the local virtualized function; and effect a resiliency action responsive to detecting the fault.

Example 2 includes the computing apparatus of example 1, wherein the resiliency controller is further configured to notify the management controller of the resiliency action via a one-directional message on the management interface, wherein the one-directional message is a message that may receive, but does not require, an acknowledgement or response from the management controller.

Example 3 includes the computing apparatus of example 1, wherein the resiliency controller is further configured to detect a failure of the resiliency action, and to place the virtualized resource into a failsafe mode.

Example 4 includes the computing apparatus of example 3, wherein the failsafe mode comprises disabling or isolating one or more egress ports of the local platform or of the virtualized function.

Example 5 includes the computing apparatus of example 1, wherein the resiliency controller is further configured to generate and maintain a topology hardware dependency graph.

Example 6 includes the computing apparatus of example 5, wherein the resiliency controller is further configured to associate hardware resources of the hardware platform with the virtualized function.

Example 7 includes the computing apparatus of example 6, wherein the resiliency controller is further configured to continuously monitor fault domains on the hardware platform.

Example 8 includes the computing apparatus of example 5, wherein the resiliency controller is further configured to customize the resiliency policy according to the hardware dependency graph.

Example 9 includes the computing apparatus of example 1, wherein the resiliency policy includes a virtual network function (VNF) policy and network function virtualization infrastructure (NFVI) policy.

Example 10 includes the computing apparatus of example 1, wherein the virtualized function is a virtual network function (VNF), and the fault is a failure of a virtualized resource.

Example 11 includes the computing apparatus of example 1, wherein the virtualized function is a virtual network function (VNF), and the fault is a failure of a localized hardware element on the hardware platform.

Example 12 includes the computing apparatus of example 1, wherein the virtualized function is a virtual network function (VNF), and the fault is a failure of connectivity to the management controller.

Example 13 includes the computing apparatus of example 1, wherein the virtualized function is a virtual switch (vSwitch).

Example 14 includes the computing apparatus of example 1, wherein the resiliency controller is isolated from software faults.

Example 15 includes the computing apparatus of any of examples 1-14, wherein the resiliency controller comprises software configured to operate on the hardware platform.

Example 16 includes the computing apparatus of any of examples 1-14, wherein the resiliency controller comprises software configured to operate on a co-processor of the hardware platform.

Example 17 includes the computing apparatus of any of examples 1-14, wherein the resiliency controller comprises an application-specific integrated circuit (ASIC).

Example 18 includes the computing apparatus of any of examples 1-14, wherein the resiliency controller comprises a field-programmable gate array (FPGA).

Example 19 includes the computing apparatus of any of examples 1-14, wherein the resiliency controller comprises an intellectual property (IP) block.

Example 20 includes the computing apparatus of any of examples 1-14, wherein the resiliency controller comprises microcode hooks into a core architecture.

Example 21 includes a resiliency controller, comprising: a management interface to communicatively couple the local platform to a management controller; a virtualization infrastructure interface to communicatively couple to a local virtualized function; and logic to: receive a resiliency policy from the management controller via the management interface, the resiliency policy comprising information to handle a fault in the virtualized function; detect a fault in the local virtualized function; and effect a resiliency action responsive to detecting the fault.

Example 22 includes the resiliency controller of example 21, wherein the logic is further to notify the management controller of the resiliency action via a one-directional message on the management interface, wherein the one-directional message is a message that may receive, but does not require, an acknowledgement or response from the management controller.

Example 23 includes the resiliency controller of example 21, wherein the logic is further to detect a failure of the resiliency action, and to place the virtualized resource into a failsafe mode.

Example 24 includes the resiliency controller of example 23, wherein the failsafe mode comprises disabling or isolating one or more egress ports of the local platform or of the virtualized function.

Example 25 includes the resiliency controller of example 21, wherein the logic is further to generate and maintain a topology hardware dependency graph.

Example 26 includes the resiliency controller of example 25, wherein the logic is further to associate hardware resources of a local hardware platform with the virtualized function.

Example 27 includes the resiliency controller of example 26, wherein the logic is further to continuously monitor fault domains on the hardware platform.

Example 28 includes the resiliency controller of example 25, wherein the logic is further to customize the resiliency policy according to the hardware dependency graph.

Example 29 includes the resiliency controller of example 21, wherein the resiliency policy includes a virtual network function (VNF) policy and network function virtualization infrastructure (NFVI) policy.

Example 30 includes the resiliency controller of example 21, wherein the virtualized function is a virtual network function (VNF), and the fault is a failure of a virtualized resource.

Example 31 includes the resiliency controller of example 21, wherein the virtualized function is a virtual network function (VNF), and the fault is a failure of a hardware element on a local hardware platform.

Example 32 includes the resiliency controller of example 21, wherein the virtualized function is a virtual network function (VNF), and the fault is a failure of connectivity to the management controller.

Example 33 includes the resiliency controller of example 21, wherein the virtualized function is a virtual switch (vSwitch).

Example 34 includes the resiliency controller of example 21, wherein the resiliency controller is isolated from software faults of a local platform.

Example 35 includes a computing apparatus comprising software configured to provide the resiliency controller of any of examples 21-34.

Example 36 includes a computing apparatus comprising a co-processor configured to provide the resiliency controller of any of examples 21-34.

Example 37 includes an application-specific integrated circuit (ASIC) comprising the resiliency controller of any of examples 21-34.

Example 38 includes a field-programmable gate array (FPGA) comprising the resiliency controller of any of examples 21-34.

Example 39 includes an intellectual property (IP) block comprising the resiliency controller of any of examples 21-34.

Example 40 includes the resiliency controller of any of examples 21-24 comprising microcode hooks into a core architecture.

Example 41 includes a method of providing local resiliency control on a computing apparatus, comprising: communicatively coupling to a management controller via a management controller interface; communicatively coupling to a local virtualized function via a virtualization infrastructure interface; receiving a resiliency policy from the management controller via the management interface, the resiliency policy comprising information to handle a fault in the virtualized function; detecting a fault in the local virtualized function; and taking a resiliency action responsive to detecting the fault.

Example 42 includes the method of example 41, further comprising notifying the management controller of the resiliency action via a one-directional message on the management interface, wherein the one-directional message is a message that may receive, but does not require, an acknowledgement or response from the management controller.

Example 43 includes the method of example 41, further comprising detecting a failure of the resiliency action, and to place the virtualized resource into a failsafe mode.

Example 44 includes the method of example 41, wherein the failsafe mode comprises disabling or isolating one or more egress ports of the local platform or of the virtualized function.

Example 45 includes the method of example 41, further comprising generating and maintaining a topology hardware dependency graph.

Example 46 includes the method of example 45, further comprising associating hardware resources of a local hardware platform with the virtualized function.

Example 47 includes the method of example 46, further comprising continuously monitoring fault domains on the hardware platform.

Example 48 includes the method of example 45, further comprising customizing the resiliency policy according to the hardware dependency graph.

Example 49 includes the method of example 48, wherein the resiliency policy includes a virtual network function (VNF) policy and network function virtualization infrastructure (NFVI) policy.

Example 50 includes the method of example 41, wherein the virtualized function is a virtual network function (VNF), and the fault is a failure of a virtualized resource.

Example 51 includes the method of example 41, wherein the virtualized function is a virtual network function (VNF), and the fault is a failure of a hardware element on a local hardware platform.

Example 52 includes the method of example 41, wherein the virtualized function is a virtual network function (VNF), and the fault is a failure of connectivity to the management controller.

Example 53 includes the method of example 41, wherein the virtualized function is a virtual switch (vSwitch).

Example 54 includes the method of example 41, wherein the resiliency controller is isolated from software faults of a local platform.

Example 55 includes a resiliency controller configured to provide the method of any of examples 41-54.

Example 56 includes an apparatus comprising means for performing the method of any of examples 41-54.

Example 57 includes the apparatus of example 56, wherein the means comprise a resiliency controller.

Example 58 includes the apparatus of example 56, wherein the resiliency controller comprises a co-processor.

Example 59 includes the apparatus of example 56, wherein the resiliency controller comprises an application-specific integrated circuit (ASIC).

Example 60 includes the apparatus of example 56, wherein the resiliency controller comprises a field-programmable gate array (FPGA).

Example 61 includes the apparatus of example 56, wherein the resiliency controller comprises an intellectual property (IP) block.

Example 62 includes the apparatus of example 56, wherein the resiliency controller comprises a processor and a memory.

Example 63 includes the apparatus of example 62, wherein the memory comprises machine-readable instructions, that when executed cause the apparatus to perform the method of any of examples 41-54.

Example 64 includes at least one computer-readable medium comprising instructions that, when executed, implement a method or realize an apparatus as illustrated in any of examples 41-63.

What is claimed is:

1. A computing apparatus, comprising:
a local platform including a hardware platform;
a management interface to communicatively couple the local platform to a management controller;
a virtualization infrastructure to operate on the hardware platform and to provide a local virtualized function; and
a resiliency controller to operate on the hardware platform, and configured to perform operations comprising:
generate and maintain a topology hardware dependency graph;

receive a resiliency policy from the management controller via the management interface, the resiliency policy comprising information to handle a fault in the local virtualized function;

detect a fault in the local virtualized function; and effect a resiliency action responsive to detecting the fault and according to the topology hardware dependency graph.

2. The computing apparatus of claim 1, wherein the resiliency controller is further configured to notify the management controller of the resiliency action via a one-directional message on the management interface, wherein the one-directional message is a message that may receive, but does not require, an acknowledgement or response from the management controller.

3. The computing apparatus of claim 1, wherein the resiliency controller is further configured to detect a failure of the resiliency action, and to place the local virtualized function into a failsafe mode.

4. The computing apparatus of claim 3, wherein the failsafe mode comprises disabling or isolating one or more egress ports of the local platform or of the local virtualized function.

5. The computing apparatus of claim 1, wherein the resiliency controller is further configured to associate hardware resources of the hardware platform with the local virtualized function.

6. The computing apparatus of claim 5, wherein the resiliency controller is further configured to continuously monitor fault domains on the hardware platform.

7. The computing apparatus of claim 1, wherein the resiliency controller is further configured to customize the resiliency policy according to the hardware dependency graph.

8. The computing apparatus of claim 1, wherein the resiliency policy includes a virtual network function (VNF) policy and a network function virtualization infrastructure (NFVI) policy.

9. The computing apparatus of claim 1, wherein the local virtualized function is a virtual network function (VNF), and the fault is a failure of a virtualized resource.

10. The computing apparatus of claim 1, wherein the local virtualized function is a virtual network function (VNF), and the fault is a failure of a localized hardware element on the hardware platform.

11. The computing apparatus of claim 1, wherein the local virtualized function is a virtual network function (VNF), and the fault is a failure of connectivity to the management controller.

12. The computing apparatus of claim 1, wherein the local virtualized function is a virtual switch (vSwitch).

13. The computing apparatus of claim 1, wherein the resiliency controller is isolated from software faults.

14. A resiliency controller, comprising:

a management interface to communicatively couple the local platform to a management controller;

a virtualization infrastructure interface to communicatively couple to a local virtualized function; and logic to:

construct a topology hardware dependency graph;

receive a resiliency policy from the management controller via the management interface, the resiliency policy comprising information to handle a fault in the local virtualized function;

detect a fault in the local virtualized function; and according to the topology hardware dependency graph, effect a resiliency action responsive to detecting the fault.

15. A computing apparatus comprising software configured to provide the resiliency controller of claim 14.

16. A computing apparatus comprising a co-processor configured to provide the resiliency controller of claim 14.

17. An application-specific integrated circuit (ASIC) comprising the resiliency controller of claim 14.

18. A field-programmable gate array (FPGA) comprising the resiliency controller of claim 14.

19. An intellectual property (IP) block comprising the resiliency controller of claim 14.

20. The resiliency controller of claim 14 comprising microcode hooks into a core architecture.

21. A method of providing local resiliency control on a computing apparatus, comprising:

communicatively coupling to a management controller via a management interface;

communicatively coupling to a local virtualized function via a virtualization infrastructure interface;

associating hardware controlled by the computing apparatus with the local virtualized function;

receiving a resiliency policy from the management controller via the management interface, the resiliency policy comprising information to handle a fault in the local virtualized function;

monitoring a plurality of fault domains of the local virtualized function according to the resiliency policy;

detecting a fault in a monitored fault domain; and effecting a resiliency action responsive to detecting the fault.

22. The method of claim 21, further comprising notifying the management controller of the resiliency action via a one-directional message on the management interface, wherein the one-directional message is a message that may receive, but does not require, an acknowledgement or response from the management controller.

23. The method of claim 21, further comprising detecting a failure of the resiliency action, and to place the local virtualized function into a failsafe mode.

24. The method of claim 23, wherein the failsafe mode comprises disabling or isolating one or more egress ports of a local platform or of the local virtualized function.

* * * * *